(12) United States Patent
Zheng et al.

(10) Patent No.: US 12,532,297 B2
(45) Date of Patent: Jan. 20, 2026

(54) METHOD AND APPARATUS FOR TRANSMITTING INITIAL ACCESS CONFIGURATION INFORMATION

(71) Applicant: Huawei Technologies Co., Ltd., Shenzhen (CN)

(72) Inventors: Juan Zheng, Beijing (CN); Yongqiang Fei, Shenzhen (CN); Hailong Hou, Beijing (CN); Chaojun Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 414 days.

(21) Appl. No.: 17/854,716

(22) Filed: Jun. 30, 2022

(65) Prior Publication Data
US 2022/0338183 A1    Oct. 20, 2022

Related U.S. Application Data

(63) Continuation of application No. PCT/CN2019/130397, filed on Dec. 31, 2019.

(51) Int. Cl.
*H04W 72/044* (2023.01)
*H04W 48/08* (2009.01)

(52) U.S. Cl.
CPC ......... *H04W 72/044* (2013.01); *H04W 48/08* (2013.01)

(58) Field of Classification Search
CPC ... H04W 72/044; H04W 48/08; H04W 48/12; H04W 48/16; H04W 72/20; H04W 72/12; H04L 1/0003; H04L 1/0009; H04L 1/0025; H04L 5/001; H04L 5/14; H04L 5/0094
See application file for complete search history.

(56) References Cited

U.S. PATENT DOCUMENTS

| | | | |
|---|---|---|---|
| 2012/0176951 | A1 | 7/2012 | Pradas et al. |
| 2016/0286555 | A1 | 9/2016 | Papasakellariou |
| 2017/0127413 | A1 | 5/2017 | Guan et al. |

(Continued)

FOREIGN PATENT DOCUMENTS

| | | |
|---|---|---|
| CN | 103220077 A | 7/2013 |
| CN | 106358301 A | 1/2017 |

(Continued)

OTHER PUBLICATIONS

Apple, "R17 enhancement for wearables", 3GPP TSG RAN Meeting #86, RP-192695, Dec. 9-12, 2019, 4 Pages, Sitges, Spain.

(Continued)

*Primary Examiner* — Tejis Daya
(74) *Attorney, Agent, or Firm* — Slater Matsil, LLP

(57) ABSTRACT

This application provides a method and an apparatus for transmitting initial access configuration information. The method includes: a first terminal device receiving first information that is sent by a network device and that includes initial access configuration information corresponding to a second terminal device. The first terminal device may obtain second information, required by the first terminal device, based on a relationship such as a difference relationship between the second information required by the first terminal device and the first information. The second information includes initial access configuration information corresponding to the first terminal device.

14 Claims, 9 Drawing Sheets

(56) References Cited

U.S. PATENT DOCUMENTS

| | | | |
|---|---|---|---|
| 2017/0311340 A1* | 10/2017 | Wu | H04W 72/12 |
| 2018/0262410 A1* | 9/2018 | Chou | H04L 43/08 |
| 2018/0288745 A1* | 10/2018 | Davydov | H03M 13/6362 |
| 2019/0280843 A1 | 9/2019 | Jeon et al. | |
| 2021/0168574 A1* | 6/2021 | Zhang | H04W 4/40 |
| 2021/0400585 A1* | 12/2021 | Zhou | H04W 52/0229 |
| 2022/0231898 A1* | 7/2022 | Li | H04W 56/001 |
| 2022/0271894 A1* | 8/2022 | Li | H04W 72/0446 |
| 2022/0408479 A1* | 12/2022 | Wang | H04W 74/006 |
| 2023/0354432 A1* | 11/2023 | Behravan | H04W 72/51 |

FOREIGN PATENT DOCUMENTS

| | | | |
|---|---|---|---|
| CN | 106792497 A | 5/2017 | |
| CN | 110022610 A | 7/2019 | |
| EP | 2524564 A2 | 11/2012 | |
| EP | 3297387 A1 | 3/2018 | |
| WO | 2011087274 A2 | 7/2011 | |
| WO | WO-2015139304 A1 * | 9/2015 | H04W 76/02 |

OTHER PUBLICATIONS

Ericsson, "Summary of email discussion on NR-Light", 3GPP TSG RAN Meeting #85, RP-192160, Sep. 16-19, 2019, 56 Pages, Newport Beach, US.

\* cited by examiner

METHOD AND APPARATUS FOR TRANSMITTING INITIAL ACCESS CONFIGURATION INFORMATION

CROSS-REFERENCE TO RELATED APPLICATIONS

This application is a continuation of International Application No. PCT/CN2019/130397, filed on Dec. 31, 2019, the disclosure of which is hereby incorporated by reference in its entirety.

TECHNICAL FIELD

This application relates to the communication field, and more specifically, to a method and an apparatus for transmitting initial access configuration information.

BACKGROUND

A synchronization signal block (SSB) includes a synchronization signal (SS) and a physical broadcast channel (PBCH) block. The PBCH carries most basic system information such as a system frame number and intra-frame timing information. A terminal device accesses a cell under the premise that the terminal device successfully receives the synchronization signal block.

The terminal device completes a cell search and synchronization process by correctly receiving a master information block (MIB) carried on the PBCH. Specifically, the terminal device receives the MIB, and obtains, from the MIB, configuration information required for interpreting system information block type 1 (SIB1) information. For example, the configuration information may include a control resource set (CORESET) and a search space (SS) that correspond to the SIB1 information. The SIB1 information is obtained based on the configuration information corresponding to the SIB1 information. The SIB1 information may include configuration information required for accessing a system by the terminal device. The terminal device may implement system access, cell selection, uplink synchronization, and the like based on the SIB1 information.

In a current new radio (NR) system, a discussion about access of a light terminal device to the NR system is conducted. The light terminal device supports a smaller bandwidth, fewer antennas, lower power consumption, lower costs, and the like. The light terminal device differs significantly from a conventional terminal device in aspects such as access capabilities and supported bandwidths.

Generally, in an initial access phase, the terminal device obtains a synchronization signal block, and receives a MIB and SIB1 information sent by a network device, to obtain necessary system information. However, conventional initial access cannot meet a complex transmission requirement.

SUMMARY

This application provides a method and an apparatus for transmitting initial access configuration information, to meet a complex transmission requirement.

According to a first aspect, a method for transmitting initial access configuration information is provided. The method for transmitting initial access configuration information may be performed by a first terminal device, or may be performed by a chip or a circuit disposed in the first terminal device. This is not limited in this application. For ease of description, the following describes an example in which the method is performed by the first terminal device.

The method for transmitting initial access configuration information includes:

A first terminal device receives first information from a network device, where the first information includes initial access configuration information corresponding to a second terminal device, and the first terminal device and the second terminal device are different types of terminal devices; and the first terminal device determines second information based on the first information and a first offset, where the second information includes initial access configuration information corresponding to the first terminal device.

In a possible implementation, the first offset is predefined, for example, predefined in a protocol.

In another possible implementation, the first offset is determined by the first terminal device based on a known parameter. For example, the first terminal device locally stores at least one difference, an association relationship exists between the at least one difference and a parameter known to the first terminal device, and the association relationship is predefined. In this case, the first terminal device determines the first offset from the at least one difference based on the known parameter and the association relationship. A difference in the at least one difference is predefined, and/or the difference in the at least one difference is obtained by the first terminal device from another device (for example, before performing current initial access, the first terminal device participates in another possible communication process, and obtains the at least one difference from the another device).

For example, the known parameter includes at least one of an index corresponding to a synchronization signal block SSB, a synchronization raster corresponding to the SSB, a frequency band occupied by the SSB, a radio resource management RRM measurement result corresponding to the SSB, or a capability of the first terminal device, or control information included in a master information block MIB.

According to the method for transmitting initial access configuration information provided in this embodiment of this application, the first terminal device may obtain, based on a relationship such as a difference relationship between the second information required by the first terminal device and the first information of the second terminal device, the second information required by the first terminal device. In this way, the network device side does not need to specially send the second information to the first terminal, so that signaling overheads are reduced, and requirements of a plurality of types of terminal devices on initial access configuration information in different scenarios are met.

With reference to the first aspect, in an implementation of the first aspect, some information in the second information is determined based on the first information and the first offset; or all information in the second information is determined based on the first information and the first offset.

Information included in the second information may be determined all based on the first information and the first offset, or may be determined partially based on the first information and the first offset. A flexible selection solution to determining the second information based on the first information and the first offset is provided.

With reference to the first aspect, in an implementation of the first aspect, when the first information includes first control information, that is, the initial access configuration information corresponding to the second terminal device is the first control information, the second information includes second control information, that is, the initial access configuration information corresponding to the first terminal device is the second control information, where the first control information is for scheduling first system information corresponding to the second terminal device, and the second control information is for scheduling second system information corresponding to the first terminal device. Alternatively, when the first information includes first system information corresponding to the second terminal device, that is, the initial access configuration information corresponding to the second terminal device is the first system information, the second information includes second system information corresponding to the first terminal device, that is, the initial access configuration information corresponding to the first terminal device is the second system information.

The initial access configuration information corresponding to the second terminal device includes initial access configuration information of the second terminal device, and may also include other configuration information of the second terminal device. A first correspondence exists between the other configuration information and the initial access configuration information. To be specific, after learning of the other configuration information, the second terminal device can learn of the initial access configuration information of the second terminal device based on the first correspondence and the other configuration information.

In a possible implementation, types of the first information and the second information are the same. When the first information is the first control information, the second information is the second control information. Similarly, when the first information is the first system information, the second information is the second system information. Possible representation forms are provided for specific types of the first information and the second information.

With reference to the first aspect, in an implementation of the first aspect, when the first control information is the first time domain resource, and the second control information is the second time domain resource, the first offset includes a time domain offset between a start moment of the first time domain resource and a start moment of the second time domain resource and/or a difference between a time length of the first time domain resource and a time length of the second time domain resource.

For example, when the first control information is the first time domain resource and the second control information is the second time domain resource, the first offset may be an offset between a start moment of the first time domain resource in time domain and a start moment of the second time domain resource in time domain and/or a difference between a time domain resource length (for example, a quantity of symbols) occupied by the first time domain resource in time domain and a time domain resource length occupied by the second time domain resource in time domain.

With reference to the first aspect, in an implementation of the first aspect, when the start moment of the first time domain resource and the start moment of the second time domain resource are located in different slots, the time domain offset includes: a slot offset and a symbol offset. The slot offset is a difference between a first slot in which the start moment of the first time domain resource is located and a second slot in which the start moment of the second time domain resource is located, and the symbol offset is a difference between a symbol index of the start moment of the first time domain resource in the first slot and a symbol index of the start moment of the second time domain resource in the second slot.

When the first time domain resource and the second time domain resource are located in different slots in time domain, the offset between the start moment of the first time domain resource in time domain and the start moment of the second time domain resource in time domain may be a slot offset and a symbol offset.

With reference to the first aspect, in an implementation of the first aspect, when an end moment of the first time domain resource is earlier than or equal to a preset moment, the method further includes: The first terminal device determines that the start moment of the first time domain resource and the start moment of the second time domain resource are located in a same slot. Alternatively, when an end moment of the first time domain resource is later than a preset moment, the method further includes: The first terminal device determines that the start moment of the first time domain resource and the start moment of the second time domain resource are located in different slots.

According to the method for transmitting initial access configuration information provided in this embodiment of this application, a time relationship between the end moment of the first time domain resource and a preset moment in time domain may be determined, and a solution to determining whether the first time domain resource and the second time domain resource are in one slot is provided.

With reference to the first aspect, in an implementation of the first aspect, when the first control information is the first frequency domain resource, and the second control information is the second frequency domain resource, the first offset includes a frequency domain offset between a start point of the first frequency domain resource and a start point of the second frequency domain resource and/or a difference between a size of the first frequency domain resource and a size of the second frequency domain resource.

For example, when the first control information is the first frequency domain resource and the second control information is the second frequency domain resource, the first offset may be an offset between a start moment of the first frequency domain resource in frequency domain and a start moment of the second frequency domain resource in frequency domain and/or a difference between a frequency domain resource length (for example, a quantity of carriers) occupied by the first frequency domain resource in frequency domain and a frequency domain resource length occupied by the second frequency domain resource in frequency domain.

With reference to the first aspect, in an implementation of the first aspect, when the first frequency domain resource is less than a first preset threshold, the start moment of the first time domain resource and the start moment of the second time domain resource are located in a same slot. Alternatively, when the first frequency domain resource is greater than a first preset threshold, the start moment of the first time domain resource and the start moment of the second time domain resource are located in different slots. Alternatively, when the first frequency domain resource is equal to a first preset threshold, the start moment of the first time domain resource and the start moment of the second time domain resource are located in different slots, or the start moment of the first time domain resource and the start moment of the second time domain resource are located in a same slot.

According to the method for transmitting initial access configuration information provided in this embodiment of this application, a size relationship between a frequency domain resource occupied by the first frequency domain resource in frequency domain and the first preset threshold that is preset may be determined, and a solution to determining whether the first time domain resource and the second time domain resource are in one slot is provided.

With reference to the first aspect, in an implementation of the first aspect, the method further includes: The first terminal device determines the first offset between the first frequency domain resource and the second frequency domain resource based on the first offset between the first time domain resource and the second time domain resource. Alternatively, the first terminal device determines the first offset between the first time domain resource and the second time domain resource based on the first offset between the first frequency domain resource and the second frequency domain resource.

According to the method for transmitting initial access configuration information provided in this embodiment of this application, an association exists between the first offset between the first time domain resource and the second time domain resource and the first offset between the first frequency domain resource and the second frequency domain resource. Therefore, the first offset between the first frequency domain resource and the second frequency domain resource can be determined based on the first offset between the first time domain resource and the second time domain resource. Alternatively, the first offset between the first time domain resource and the second time domain resource may be determined based on the first offset between the first frequency domain resource and the second frequency domain resource.

With reference to the first aspect, in an implementation of the first aspect, when the first control information is the first MCS, and the second control information is the second MCS, the first offset includes an offset between the first MCS and the second MCS.

For example, when the first control information is the first MCS, and the second control information is the second MCS, the first offset may be the offset between the first MCS and the second MCS.

With reference to the first aspect, in an implementation of the first aspect, when the first control information is the first RV, and the second control information is the second RV, the first offset includes an offset between the first RV and the second RV.

For example, when the first control information is the first RV, and the second control information is the second RV, the first offset may be the offset between the first RV and the second RV.

With reference to the first aspect, in an implementation of the first aspect, the first system information includes at least one of the following information: a first threshold configuration related to cell selection performed by the second terminal device, a first BWP configuration corresponding to the second terminal device, or a first RACH resource corresponding to the second terminal device; and the second system information includes at least one of the following information: a second threshold configuration related to cell selection performed by the first terminal device, a second BWP configuration corresponding to the first terminal device, or a second RACH resource corresponding to the first terminal device.

The first system information may include a plurality of types of information. Similarly, the second system information may include a plurality of types of information. This is not limited in this application. A flexible selection solution is provided for information types that may be included in system information.

With reference to the first aspect, in an implementation of the first aspect, the first offset includes a difference between the first threshold configuration and the second threshold configuration, a difference between the first BWP configuration and the second BWP configuration, or a difference between the first RACH resource and the second RACH resource.

A new solution to determining the second information is provided by using different forms of the first offset.

With reference to the first aspect, in an implementation of the first aspect, the first offset is predefined.

For example, a value of the first offset is predefined in a protocol. A convenient implementation for determining the first offset is provided.

With reference to the first aspect, in an implementation of the first aspect, the first offset is associated with at least one of the following parameters: an index corresponding to a synchronization signal block SSB, a synchronization raster corresponding to the SSB, a frequency band occupied by the SSB, a radio resource management RRM measurement result corresponding to the SSB, a capability of the first terminal device, or control information included in a master information block MIB, and an association relationship between the first offset and the parameter is predefined, where the SSB and the first information or the second information meet a quasi-colocation QCL relationship, and the MIB is information carried on a physical broadcast channel PBCH included in the SSB. The method further includes: The first terminal device determines the first offset based on the association relationship and at least one of the foregoing parameters.

For example, the first offset and some parameters that are known before the first terminal device completes initial access meet an association relationship. To be specific, the first terminal device may select an appropriate first offset based on the known parameters.

With reference to the first aspect, in an implementation of the first aspect, the first information is control information for scheduling system information block type 1 SIB1 information, and the first information is transmitted through a physical downlink control channel PDCCH that carries the control information for scheduling the SIB1 information; or the first information is SIB1 information, and the first information is transmitted through a physical downlink shared channel PDSCH that carries the SIB1 information.

The first information may be transmitted through the physical downlink control channel PDCCH that carries the control information for scheduling the SIB1 information or the physical downlink shared channel PDSCH that carries the SIB1 information. Different selection solutions are provided for transmitting the first information.

With reference to the first aspect, in an implementation of the first aspect, that the first terminal device and the second terminal device are different types of terminal devices includes but is not limited to a combination of one or more of the following cases: a bandwidth capability of the first terminal device is different from a bandwidth capability of the second terminal device, a quantity of transmit and receive antennas of the first terminal device is different from a quantity of transmit and receive antennas of the second terminal device, a maximum uplink transmit power of the first terminal device is different from a maximum uplink transmit power of the second terminal device, a protocol version corresponding to the first terminal device is different from a protocol version corresponding to the second terminal device, a carrier aggregation capability supported by the first terminal device is different from a carrier aggregation capability supported by the second terminal device, a duplex capability of the first terminal device is different from a duplex capability of the second terminal device, a processing capability of the first terminal device is different from a processing capability of the second terminal device, or a peak transmission rate of the first terminal device is different from a peak transmission rate corresponding to the second terminal device.

There may be a plurality of specific forms for representing that the first terminal device and the second terminal device are different types of terminal devices. This is not limited in this application.

With reference to the first aspect, in an implementation of the first aspect, the method further includes: The first terminal device performs initial access based on the second information.

After determining the second information, the first terminal device can perform initial access based on the initial access configuration information that corresponds to the first terminal device and that is included in the second information. After completing the initial access procedure, the first terminal device may further implement data transmission with the network device based on information that is related to a data transmission configuration and that is included in the second information.

According to a second aspect, a method for transmitting initial access configuration information is provided. The method for transmitting initial access configuration information may be performed by a first terminal device, or may be performed by a chip or a circuit disposed in the first terminal device. This is not limited in this application. For ease of description, the following describes an example in which the method is performed by the first terminal device.

The method for transmitting initial access configuration information includes:

A first terminal device receives first information from a network device, where the first information includes initial access configuration information corresponding to a second terminal device, and the first terminal device and the second terminal device are different types of terminal devices; and the first terminal device determines second information based on the first information and a correspondence, where the second information includes initial access configuration information corresponding to the first terminal device.

In a possible implementation, the correspondence is predefined, for example, predefined in a protocol.

In another possible implementation, the correspondence is determined by the first terminal device based on a known parameter. For example, the first terminal device locally stores at least one correspondence, an association relationship exists between the at least one correspondence and a parameter known to the first terminal device, and the association relationship is predefined. In this case, the first terminal device determines the correspondence from the at least one correspondence based on the known parameter and the association relationship. A correspondence in the at least one correspondence is predefined, and/or the correspondence in the at least one correspondence is obtained by the first terminal device from another device (for example, before performing current initial access, the first terminal device participates in another possible communication process, and obtains the at least one correspondence from the another device).

For example, the known parameter includes at least one of an index corresponding to a synchronization signal block SSB, a synchronization raster corresponding to the SSB, a frequency band occupied by the SSB, a radio resource management RRM measurement result corresponding to the SSB, a capability of the first terminal device, or control information included in a master information block MIB. According to the method for transmitting initial access configuration information provided in this embodiment of this application, the first terminal device may obtain, based on a relationship such as the correspondence between the second information required by the first terminal device and the first information of the second terminal device, the second information required by the first terminal device. In this way, the network device side does not need to specially send the second information to the first terminal, so that signaling overheads are reduced, and requirements of a plurality of types of terminal devices on initial access configuration information in different scenarios are met.

With reference to the second aspect, in an implementation of the second aspect, some information in the second information is determined based on the first information and the correspondence; or all information in the second information is determined based on the first information and the correspondence.

Information included in the initial access configuration information corresponding to the first terminal device may be determined all based on the first information and the correspondence, or may be determined partially based on the first information and the correspondence. This is not limited in this application. A flexible selection solution can be provided.

With reference to the second aspect, in an implementation of the second aspect, the first information includes first control information and third indication information, where the first control information is for scheduling first system information corresponding to the second terminal device. That the first terminal device determines the second information based on the first information and the correspondence includes: The first terminal device determines the second information based on the third indication information and the correspondence, where the second information includes second system information corresponding to the first terminal device.

For example, the first information includes the third indication information, and the third indication information and the correspondence are jointly used to determine the second system information corresponding to the first terminal device. It may be understood that the first control information that corresponds to the second terminal device and that is included in the first information is different from a type of the second system information determined by the first terminal device.

With reference to the second aspect, in an implementation of the second aspect, the correspondence is predefined.

For example, the correspondence is specifically predefined in a protocol. A convenient implementation for determining the correspondence is provided.

With reference to the second aspect, in an implementation of the second aspect, the correspondence is associated with at least one of the following parameters: an index corresponding to a synchronization signal block SSB, a synchronization raster corresponding to the SSB, a frequency band occupied by the SSB, a radio resource management RRM measurement result corresponding to the SSB, a capability of the first terminal device, or control information included in a master information block MIB, and an association relationship between the correspondence and the parameter is predefined, where the SSB and the first information or the second information meet a quasi-colocation QCL relationship, and the MIB is information carried on a physical broadcast channel PBCH included in the SSB. The method further includes: The first terminal device determines the correspondence based on the association relationship and at least one of the foregoing parameters.

For example, the correspondence and some parameters that are known before the first terminal device completes initial access meet an association relationship. To be specific, the first terminal device may select an appropriate correspondence based on the known parameters.

With reference to the second aspect, in an implementation of the second aspect, the first information is control information for scheduling system information block type 1 SIB1 information, and the first information is transmitted through a physical downlink control channel PDCCH that carries the control information for scheduling the SIB1 information; or the first information is SIB1 information, and the first information is transmitted through a physical downlink shared channel PDSCH that carries the SIB1 information.

The first information may be transmitted through the physical downlink control channel PDCCH that carries the control information for scheduling the SIB1 information or the physical downlink shared channel PDSCH that carries the SIB1 information. Different selection solutions are provided for transmitting the first information.

With reference to the second aspect, in an implementation of the second aspect, that the first terminal device and the second terminal device are different types of terminal devices includes but is not limited to a combination of one or more of the following cases: a bandwidth capability of the first terminal device is different from a bandwidth capability of the second terminal device, a quantity of transmit and receive antennas of the first terminal device is different from a quantity of transmit and receive antennas of the second terminal device, a maximum uplink transmit power of the first terminal device is different from a maximum uplink transmit power of the second terminal device, a protocol version corresponding to the first terminal device is different from a protocol version corresponding to the second terminal device, a carrier aggregation capability supported by the first terminal device is different from a carrier aggregation capability supported by the second terminal device, a duplex capability of the first terminal device is different from a duplex capability of the second terminal device, a processing capability of the first terminal device is different from a processing capability of the second terminal device, or a peak transmission rate of the first terminal device is different from a peak transmission rate corresponding to the second terminal device.

For the method for transmitting initial access configuration information in the second aspect, refer to the implementations described in the method in the first aspect. A same or similar technical means may be used to achieve a same or similar technical effect. Details are not described again.

There may be a plurality of specific forms for representing that the first terminal device and the second terminal device are different types of terminal devices. This is not limited in this application.

According to a third aspect, a method for transmitting initial access configuration information is provided. The method for transmitting initial access configuration information may be performed by a network device, or may be performed by a chip or a circuit disposed in the network device. This is not limited in this application. For ease of description, the following describes an example in which the method is performed by the network device.

The method for transmitting initial access configuration information includes:

A network device generates first information, where the first information includes initial access configuration information corresponding to a second terminal device; and the network device sends the first information to a first terminal device, where the first information is used by the first terminal device to determine second information, the second information is determined by the first terminal device based on the first information and a first offset, the second information includes initial access configuration information corresponding to the first terminal device, and the first terminal device and the second terminal device are different types of terminal devices.

It should be understood that the second terminal device can also receive the first information sent by the network device.

According to the method for transmitting initial access configuration information provided in this embodiment of this application, the first terminal device may obtain, based on a relationship between the second information required by the first terminal device and the first information of the second terminal device, the second information required by the first terminal device. In this way, the network device side does not need to specially send the second information to the first terminal, so that signaling overheads are reduced, and requirements of a plurality of types of terminal devices on initial access configuration information in different scenarios are met.

According to a fourth aspect, an apparatus for transmitting initial access configuration information is provided. The apparatus for transmitting initial access configuration information includes a processor, configured to implement functions of the first terminal device in the methods described in the first aspect and the second aspect.

Optionally, the apparatus for transmitting initial access configuration information may further include a memory. The memory is coupled to the processor, and the processor is configured to implement functions of the first terminal device in the methods described in the first aspect and the second aspect.

In a possible implementation, the memory is configured to store program instructions and data. The memory is coupled to the processor, and the processor may invoke and execute the program instruction stored in the memory, to implement functions of the first terminal device in the methods described in the first aspect and the second aspect.

Optionally, the apparatus for transmitting initial access configuration information may further include a communication interface. The communication interface is used by the apparatus for transmitting initial access configuration information to communicate with another device. When the apparatus for transmitting initial access configuration information is a terminal device, the transceiver may be a communication interface or an input/output interface.

In a possible design, the apparatus for transmitting initial access configuration information includes a processor and a communication interface, configured to implement functions of the first terminal device in the methods described in the first aspect and the second aspect. Details are as follows:

The communication interface is used by the processor to perform external communication.

The processor is configured to run a computer program, to enable the apparatus to implement any method described in the first aspect and the second aspect.

It may be understood that the external communication may be communication with an object other than the processor, or an object other than the apparatus.

In another implementation, when the apparatus for transmitting initial access configuration information is a chip or a chip system, the communication interface may be an input/output interface, an interface circuit, an output circuit, an input circuit, a pin, a related circuit, or the like on the chip or the chip system. The processor may alternatively be embodied as a processing circuit or a logic circuit.

According to a fifth aspect, an apparatus for transmitting initial access configuration information is provided. The apparatus for transmitting initial access configuration information includes a processor, configured to implement functions of the network device in the method described in the third aspect.

Optionally, the apparatus for transmitting initial access configuration information may further include a memory, the memory is coupled to the processor, and the processor is configured to implement functions of the network device in the method described in the third aspect.

In a possible implementation, the memory is configured to store program instructions and data. The memory is coupled to the processor, and the processor may invoke and execute the program instructions stored in the memory, to implement the functions of the network device in the method described in the third aspect.

Optionally, the apparatus for transmitting initial access configuration information may further include a communication interface. The communication interface is used by the apparatus for transmitting initial access configuration information to communicate with another device. When the apparatus for transmitting initial access configuration information is a terminal device, the transceiver may be a communication interface or an input/output interface.

In a possible design, the apparatus for transmitting initial access configuration information includes a processor and a communication interface, configured to implement functions of the network device in the method described in the third aspect. Details are as follows:

The communication interface is used by the processor to perform external communication.

The processor is configured to run a computer program, to enable the apparatus to implement any method described in the third aspect.

It may be understood that the external communication may be communication with an object other than the processor, or an object other than the apparatus.

In another implementation, when the apparatus for transmitting initial access configuration information is a chip or a chip system, the communication interface may be an input/output interface, an interface circuit, an output circuit, an input circuit, a pin, a related circuit, or the like on the chip or the chip system. The processor may alternatively be embodied as a processing circuit or a logic circuit.

According to a sixth aspect, a computer-readable storage medium is provided. The computer-readable storage medium stores a computer program. When the computer program is executed by a communication apparatus, the communication apparatus is enabled to implement the method in any one of the first aspect and the second aspect and the possible implementations of the first aspect and the second aspect.

According to a seventh aspect, a computer-readable storage medium is provided. The computer-readable storage medium stores a computer program. When the computer program is executed by a communication apparatus, the communication apparatus is enabled to implement the method in any one of the third aspect and the possible implementations of the third aspect.

According to an eighth aspect, a computer program product including instructions is provided. When the instructions are executed by a computer, a communication apparatus is enabled to implement the method in any one of the first aspect and the second aspect and the possible implementations of the first aspect and the second aspect According to a ninth aspect, a computer program product including instructions is provided. When the instructions are executed by a computer, a communication apparatus is enabled to implement the method in any one of the third aspect and the possible implementations of the third aspect.

According to a tenth aspect, a communication system is provided. The communication system includes the apparatus for transmitting initial access configuration information in the fourth aspect and the apparatus for transmitting initial access configuration information in the fifth aspect.

According to an eleventh aspect, a method for determining a resource location is provided. The method is applied to a communication system including a first terminal device and a second terminal device. The first terminal device and the second terminal device are different types of terminal devices. The first terminal device corresponds to first system information, and the second terminal device corresponds to second system information. The method for determining a resource location includes: determining, based on a preset threshold, a location relationship between a first time domain resource occupied for transmitting the first system information and a second time domain resource occupied for transmitting the second system information.

According to the method for determining a resource location provided in this application, a location relationship between time domain resources occupied for transmitting system information corresponding to different types of terminal devices may be determined based on the preset threshold. A simple solution to determining the location relationship between the time domain resources occupied for transmitting the system information corresponding to the different types of terminal devices is provided.

With reference to the eleventh aspect, in an implementation of the eleventh aspect, the determining, based on a preset threshold, a location relationship between a first time domain resource occupied for transmitting the first system information and a second time domain resource occupied for transmitting the second system information includes: when a first frequency domain resource occupied for transmitting the first system information is less than a first preset threshold, a start moment of the first time domain resource and a start moment of the second time domain resource are located in a same slot;

when a first frequency domain resource is greater than a first preset threshold, a start moment of the first time domain resource and a start moment of the second time domain resource are located in different slots; or when a first frequency domain resource is equal to the first preset threshold, a start moment of the first time domain resource and a start moment of the second time domain resource are located in different slots or a same slot.

In a possible implementation, it may be determined, based on a size relationship between a size of the first frequency domain resource occupied for transmitting the first system information corresponding to the first terminal device and the first preset threshold, whether start moments of time domain resources occupied by the system information corresponding to the different types of terminal devices are in a same slot.

With reference to the eleventh aspect, in an implementation of the eleventh aspect, the first preset threshold includes:

half of a bandwidth of the first information, where the first information includes initial access configuration information corresponding to the second terminal device.

Optionally, the first preset threshold may be half of the bandwidth of the first information. An implementation of the first preset threshold is provided.

With reference to the eleventh aspect, in an implementation of the eleventh aspect, the determining, based on a preset threshold, a location relationship between a first time domain resource occupied for transmitting the first system information and a second time domain resource occupied for transmitting the second system information includes:

when a range of a first frequency domain resource occupied for transmitting the first system information is properly included in a first preset frequency domain range, a start moment of the first time domain resource and a start moment of the second time domain resource are located in a same slot;

when a first preset frequency domain range is properly included in a range of a first frequency domain resource, a start moment of the first time domain resource and a start moment of the second time domain resource are located in different slots; or when a range of a first frequency domain resource overlaps a first preset frequency domain range, a start moment of the first time domain resource and a start moment of the second time domain resource are located in a same slot or different slots.

In a possible implementation, it may be determined, based on a location relationship between the range of the first frequency domain resource occupied for transmitting the first system information corresponding to the first terminal device and the first preset frequency domain range, whether start moments of time domain resources occupied by the system information corresponding to the different types of terminal devices are in a same slot.

With reference to the eleventh aspect, in an implementation of the eleventh aspect, the first preset frequency domain range includes:

a frequency domain range formed by a start point and a midpoint of a frequency domain range corresponding to the bandwidth of the first information.

With reference to the eleventh aspect, in an implementation of the eleventh aspect, the determining, based on a preset threshold, a location relationship between a first time domain resource occupied for transmitting the first system information and a second time domain resource occupied for transmitting the second system information includes:

when an end moment of the first time domain resource is earlier than or equal to a preset moment, a start moment of the first time domain resource and a start moment of the second time domain resource are located in a same slot; or when an end moment of the first time domain resource is later than a preset moment, a start moment of the first time domain resource and a start moment of the second time domain resource are located in different slots.

In a possible implementation, it may be determined, based on a time relationship between the end moment of the first time domain resource occupied for transmitting the first system information corresponding to the first terminal device and the preset moment, whether start moments of time domain resources occupied by the system information corresponding to the different types of terminal devices are in a same slot.

With reference to the eleventh aspect, in an implementation of the eleventh aspect, the preset moment includes:

an (N/2)th OFDM symbol in a first slot, where N is a total quantity of OFDM symbols included in the first slot.

Optionally, the preset moment may be the (N/2)th OFDM symbol in the first slot.

According to a twelfth aspect, an apparatus for determining a resource location is provided. The apparatus for determining a resource location includes a processor, configured to implement the steps in the method described in the eleventh aspect.

Optionally, the apparatus for determining a resource location may further include a memory, the memory is coupled to the processor, and the processor is configured to implement the steps in the method described in the eleventh aspect.

In a possible implementation, the memory is configured to store program instructions and data. The memory is coupled to the processor, and the processor may invoke and execute the program instructions stored in the memory, to implement the steps in the method described in the eleventh aspect.

Optionally, the apparatus for determining a resource location may further include a communication interface, and the communication interface is used by the apparatus for determining a resource location to communicate with another device. When the apparatus for determining a resource location is a terminal device, the transceiver may be a communication interface or an input/output interface.

In a possible design, the apparatus for determining a resource location includes a processor and a communication interface, configured to implement the steps in the method described in the eleventh aspect. Details are as follows:

The communication interface is used by the processor to perform external communication.

The processor is configured to run a computer program, to enable the apparatus to implement any method described in the eleventh aspect.

It may be understood that the external communication may be communication with an object other than the processor, or an object other than the apparatus.

In another implementation, when the apparatus for determining a resource location is a chip or a chip system, the communication interface may be an input/output interface, an interface circuit, an output circuit, an input circuit, a pin, a related circuit, or the like on the chip or the chip system. The processor may alternatively be embodied as a processing circuit or a logic circuit.

According to a thirteenth aspect, a computer-readable storage medium is provided. The computer-readable storage medium stores a computer program. When the computer program is executed by a communication apparatus, the communication apparatus is enabled to implement the method in any one of the eleventh aspect and the possible implementations of the eleventh aspect.

According to a fourteenth aspect, a computer program product including instructions is provided. When the instructions are executed by a computer, a communication apparatus is enabled to implement the method in any one of the eleventh aspect and the possible implementations of the eleventh aspect.

DETAILED DESCRIPTION OF ILLUSTRATIVE EMBODIMENTS

Figure 1:
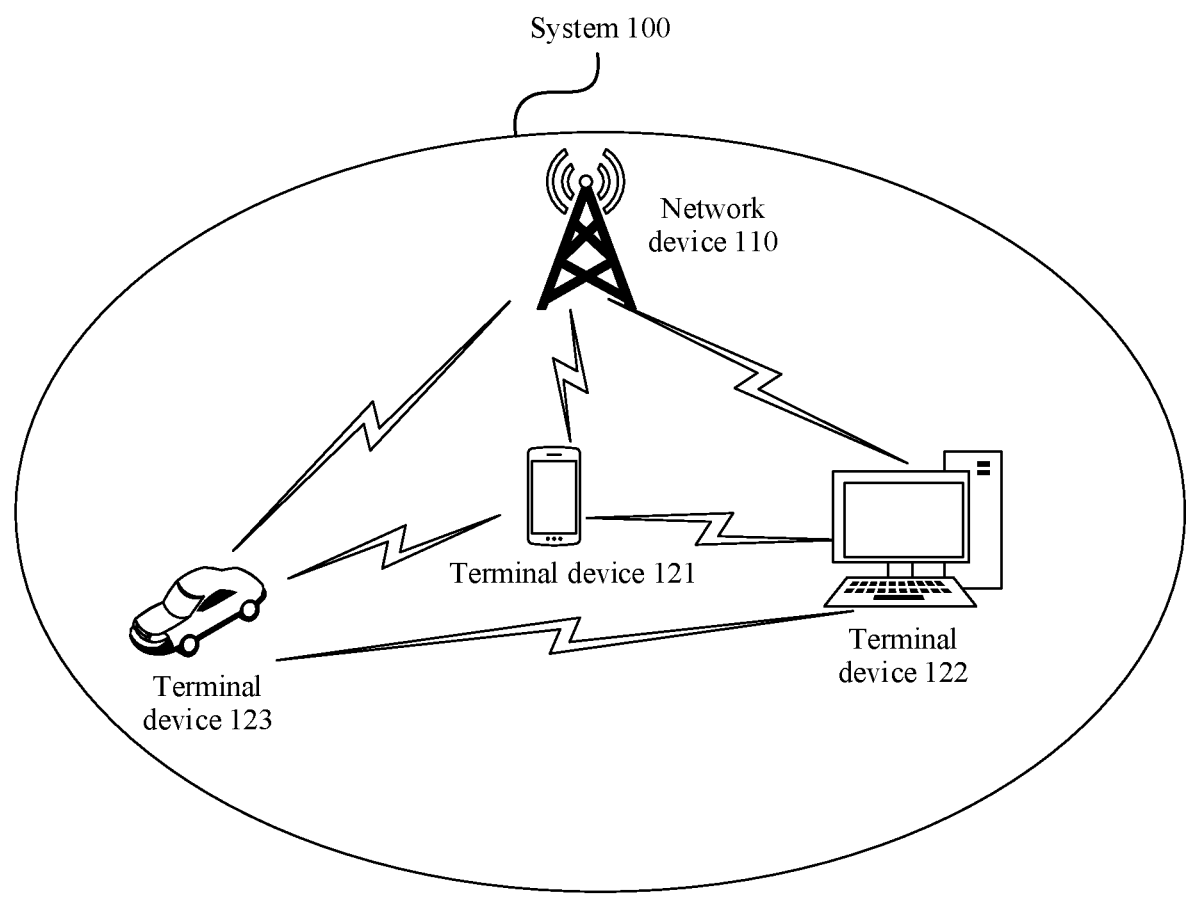
FIG. 1 is a schematic diagram of a system 100 to which a method for transmitting initial access configuration information according to an embodiment of this application is applicable.

The following describes the technical solutions of this application with reference to the accompanying drawings.

The technical solutions in embodiments of this application may be applied to various communication systems, for example, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a 5th generation (5G) system, or a new radio (NR) system. The technical solutions provided in this application are further applicable to a future communication system, for example, a 6th generation mobile communication system. Alternatively, the communication system may be a public land mobile network (PLMN), a device-to-device (D2D) communication system, a machine-to-machine (M2M) communication system, an internet of things (IoT) communication system, or another communication system.

A terminal device (terminal equipment) in embodiments of this application may be an access terminal, a subscriber unit, a subscriber station, a mobile station, a mobile console, a relay station, a remote station, a remote terminal, a mobile device, a user terminal, user equipment (UE), a terminal, a wireless communication device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a 5G network, a terminal device in a future evolved public land mobile network (PLMN), a terminal device in a future internet of vehicles, or the like. This is not limited in embodiments of this application.

As an example rather than a limitation, in embodiments of this application, the wearable device may also be referred to as a wearable intelligent device, and is a generic term for wearable devices such as glasses, gloves, watches, clothes, and shoes that are developed based on intelligent design of daily wearing by using wearable technologies. The wearable device is a portable device that can be directly worn by a user or integrated into clothes or an accessory of the user. The wearable device is not only a hardware device, but also implements a powerful function through software support, data exchange, and cloud interaction. In a board sense, wearable intelligent devices include full-featured and large-sized devices that can implement complete or partial functions without depending on smartphones, such as smart watches or smart glasses, and devices that focus on only one type of application function and need to work with other devices such as smartphones, such as various smart bands or smart jewelry for monitoring physical signs.

In addition, the terminal device in embodiments of this application may alternatively be a terminal device in an IoT system. IoT is an important part of future development of information technologies. A main technical feature of the IoT is connecting a thing to a network by using a communication technology, to implement an intelligent network for interconnection between a person and a machine or between things. In embodiments of this application, an IoT technology may implement massive connections, deep coverage, and terminal power saving by using, for example, a narrow-band (NB) technology.

In addition, in embodiments of this application, the terminal device may further include a sensor such as an intelligent printer, a train detector, or a gas station. Main functions of the terminal device include collecting data (for some terminal devices), receiving control information and downlink data from a network device, sending an electromagnetic wave, and sending uplink data to the network device.

The network device in embodiments of this application may be any communication device that has a wireless transceiver function and that is configured to communicate with the terminal device. The device includes but is not limited to an evolved NodeB (eNB), a radio network controller (RNC), a NodeB (NB), a base station controller (BSC), a base transceiver station BTS), a home base station (home evolved NodeB, HeNB or home NodeB, HNB), a baseband unit (BBU), an access point (AP) in a wireless fidelity (Wi-Fi) system, a wireless relay node, a wireless backhaul node, a transmission point (TP), a transmission reception point (TRP), or the like. Alternatively, the device may be a gNB or a transmission point (TRP or TP) in a 5G system such as an NR system; may be an antenna panel or a group of antenna panels (including a plurality of antenna panels) of a base station in a 5G system; or may be a network node, such as a baseband unit (BBU) or a distributed unit (DU), that constitutes a gNB or a transmission point.

In some deployments, the network device in embodiments of this application may be a centralized unit (CU), a distributed unit (DU), or the like. The network device includes the CU and the DU. The gNB may further include an active antenna unit (AAU). The CU implements some functions of the gNB, and the DU implements some functions of the gNB. For example, the CU is responsible for processing a non-real-time protocol and a service, to implement functions of a radio resource control (RRC) layer and a packet data convergence protocol (PDCP) layer. The DU is responsible for processing a physical layer protocol and a real-time service, and implements functions of a radio link control (RLC) layer, a media access control (MAC) layer, and a physical (PHY) layer. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the network device may be a device including one or more of a CU node, a DU node, and an AAU node. In addition, the CU may be classified into a network device in an access network (RAN), or the CU may be classified into a network device in a core network (CN). This is not limited in this application.

The network device and the terminal device may be deployed on land, including indoors or outdoors and handheld or in-vehicle, or may be deployed on the water, or may be deployed on an airplane, a balloon, or a satellite in the air. Scenarios in which the network device and the terminal device are located are not limited in embodiment of this application.

In embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more computer operating systems that implement service processing through a process, for example, a Linux operating system, a Unix operating system, an Android operating system, an iOS operating system, or a Windows operating system. The application layer includes applications such as a browser, a contact list, word processing software, and instant messaging software.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to: a magnetic storage component (for example, a hard disk, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable storage media" may include but is not limited to a radio channel, and various other media that can store, include, and/or carry instructions and/or data.

For ease of understanding of embodiments of this application, the communication system shown in FIG. 1 is first used as an example to describe in detail a communication system to which embodiments of this application are applicable. FIG. 1 is a schematic diagram of a communication system 100 to which a method for transmitting initial access configuration information according to an embodiment of this application is applicable. As shown in FIG. 1, the communication system 100 includes four communication devices, for example, a network device 110 and terminal devices 121 to 123. The terminal devices 121 to 123 may all be light terminal devices, or the terminal devices 121 to 123 include a light terminal device and conventional eMBB and URLLC terminal devices. When accessing the system, at least one of the terminal devices 121 to 123 and the network device 110 may access the system and obtain initial access configuration information, for example, a SIB1, by using the method provided in this application.

It should be understood that the communication system shown in FIG. 1 may further include more network nodes, for example, terminal devices or network devices. The network device or the terminal devices included in the communication system shown in FIG. 1 may be the network device or the terminal devices in the foregoing various forms. These are not shown one by one in the figures in embodiments of this application.

For ease of understanding embodiments of this application, several basic concepts in embodiments of this application are briefly described. It should be understood that basic concepts described below are briefly described by using a basic concept specified in an NR protocol as an example, but embodiments of this application are not limited to being applied only to an NR system. Therefore, standard names appearing when the NR system is used as an example for description are all functional descriptions. Specific names are not limited. The names indicate only functions of a device, and may be correspondingly extended to another system, for example, a 2G, 3G, 4G, or future communication system.

1. 5G NR System

Currently, with people's pursuit of a high speed, a low delay, high-speed mobility, and energy efficiency, and with the diversity and complexity of services in future life, the international standards organization has started to develop 5G. Main application scenarios of 5G are enhanced mobile broadband (eMBB), ultra-reliable low-latency communication (URLLC), and massive machine type communications (mMTC). An mMTC service may be an industrial wireless sensor network (IWSN) service, a video surveillance service, and a wearable service.

Diversified NR system services result in different performance requirements of different types of terminal devices. For example, for an eMBB service, the NR system needs to provide a high data transmission rate; for a URLLC service, the NR system needs to ensure low-latency and high-reliability data transmission performance; and for an mMTC service, low-power data transmission performance and a large-connection data transmission requirement can be ensured.

Therefore, a concept of an NR-light terminal device is introduced to the NR system. Light is only a current name, and this application does not exclude another name that may be used in the future.

It should be understood that, in this application, the NR-light terminal device may also be understood as a reduced-capability terminal device, or may be referred to as another terminal device. A name of the reduced-capability terminal device is not limited in this application, and is merely used to indicate that the reduced-capability terminal device is a terminal device of a different type from a common terminal device. For ease of description, in this application, the reduced-capability terminal device is described as an NR-light terminal device, but the name does not constitute any limitation on the protection scope of this application.

2. NR-Light Terminal

In Release 17, the concept of the NR-light terminal device is introduced in NR. The NR-light terminal device supports a smaller bandwidth, fewer antennas, lower power consumption, lower costs, and the like. The NR-light terminal device differs significantly from a conventional terminal in access capabilities and supported bandwidths.

Currently, the NR-light terminal device mainly has three application scenarios:
- (a) Industrial wireless sensor. Compared with URLLC, the industrial wireless sensors have relatively low requirements on latency and reliability. In addition, in terms of costs and power consumption in a URLLC scenario and an eMBB scenario, the NR-light terminal device has relatively low costs and power consumption.
- (b) Video surveillance. The NR-light terminal can be mainly used in video surveillance of smart cities and industrial factories, and can also be used to collect and process data in smart cities, so as to monitor and control city resources more effectively and provide more effective services for urban residents.
- (c) Wearable device. The wearable device may include a smartwatch, a ring, an electronic health device, some medical monitoring devices, and the like. These devices have small sizes.

The foregoing three scenarios have a common requirement, which may be specifically as follows:
- (a) Equipment costs. Compared with the eMBB scenario in Release 15 or Release 16, the foregoing three scenarios require lower device costs and complexity. Costs and complexity of the NR-light terminal device may be reduced by reducing a bandwidth and receive antennas.
- (b) Device size. The foregoing three scenarios require a small device size.
- (c) Coverage rate. In the foregoing three scenarios, a coverage rate needs to be the same as that of the eMBB scenario in Release 15 or Release 16. A coverage loss caused by reducing receive antennas, reducing a bandwidth, reducing a power level, reducing complexity of a terminal device, or the like needs to be compensated for.

For the foregoing three scenarios, in addition to the preceding common requirements, different scenarios have different requirements.

For industrial wireless sensors, a reliability requirement is 99.99%, an end-to-end latency requirement is 100 ms, and a bit rate requirement is 2 Mbps. In this scenario, the NR-light terminal device is required to be stationary, and the battery life is required to be several years. For security-related sensors, a latency requirement is 5 ms to 10 ms.

For video surveillance, a bit rate requirement is 2 Mbps to 4 Mbps, a latency requirement is less than 500 ms, and a reliability requirement is 99% to 99.9%.

For a wearable device, a bit rate requirement is 150 Mbps or 50 Mbps.

3. Bandwidth Part (BWP)

A maximum channel bandwidth supported in the NR system may reach 400 MHz. If a terminal device keeps operating on a broadband carrier, power consumption of the terminal device is high. Adjusting a radio frequency bandwidth of the terminal device based on an actual throughput of the terminal device may optimize the power consumption of the terminal device. Therefore, a concept of a BWP is introduced in 5G NR. To be specific, the terminal device may perform data receiving and sending on a part of contiguous bandwidths (namely, BWPs) in an entire large-bandwidth carrier.

Currently, all terminal devices in an idle (RRC_IDLE) state and an inactive (RRC_INACTIVE) state may determine a corresponding downlink initial BWP by using a frequency resource corresponding to a CORESET for scheduling a SIB1, or may determine a corresponding downlink initial BWP by using indication information included in SIB1 information. In this application, for brevity of description, unless otherwise specified, the downlink initial BWP is an initial BWP of the terminal device in the RRC_IDLE state and the RRC_INACTIVE state. For example, the downlink initial BWP is a BWP indicated by a MIB, or a BWP corresponding to receiving paging, system information, or a random access response (random access response, RAR) by the terminal device in the RRC_IDLE/RRC_INACTIVE state. Alternatively, the downlink initial BWP is a BWP for data transmission between the terminal device in a connected state and the network device when the terminal device enters an energy saving mode. It may be understood that the downlink initial BWP may alternatively be used when the terminal device is in an RRC Connected state.

4. Synchronization Signal Block

Figure 2:
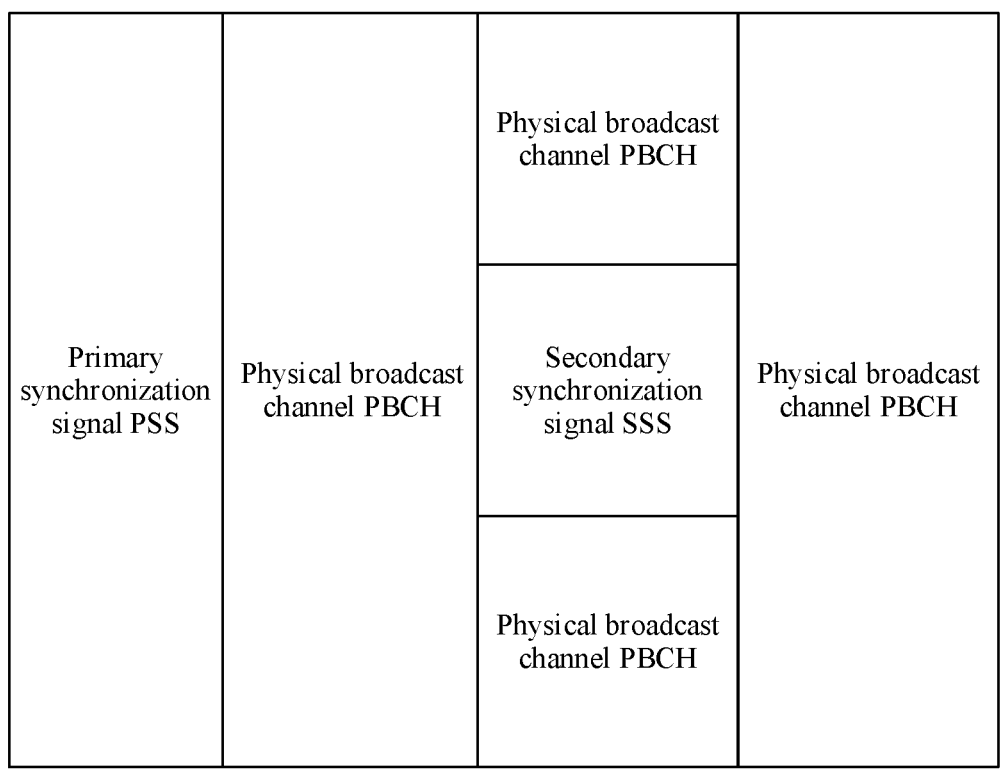
FIG. 2 is a schematic diagram of a possible structure of a synchronization signal block.

An SSB that includes a synchronization signal and a physical broadcast channel block (physical broadcast channel block, PBCH block) is a signal structure, and is applicable to a 5G communication system and a later communication system. FIG. 2 is a schematic diagram of a possible structure of a synchronization signal block. As shown in FIG. 2, the synchronization signal block includes a primary synchronization signal (primary synchronization signal, PSS), a secondary synchronization signal (secondary synchronization signal, SSS), and a physical broadcast channel (physical broadcast channel, PBCH). The PSS and the SSS are mainly used to help a terminal device identify a cell and synchronize with the cell. The PBCH includes most basic system information, for example, a system frame number and intra-frame timing information. The terminal device accesses the cell under the premise that the terminal device successfully receives the synchronization signal block.

5. A Terminal Accesses a Communication System.

When accessing a wireless communication system, for example, accessing an LTE system or an NR system, a terminal device first needs to synchronize with an access network device in the wireless communication system. To be specific, the terminal device first obtains, by detecting a synchronization signal sent by the access network device, synchronization information for data transmission with the access network device. The synchronization information includes time synchronization information and/or frequency synchronization information. Then, the terminal device determines, based on the obtained synchronization information, broadcast information included by the access network device on a PBCH, and further reads system information (system information, SI) as required. The SI is cell-level information, that is, valid for all terminal devices or some terminal devices accessing the cell. The SI is formed by system information blocks (system information blocks, SIBs), and each SIB includes a parameter set related to a function corresponding to the SIB. SIB types are shown in Table 1:

TABLE 1

| SIB type | Content | Periodicity (ms) | Transmission channel |
|---|---|---|---|
| MIB | Including parameters required by the terminal device to obtain other SI (necessary information for a user to access a network) | 80 | Broadcast channel |
| SIB1 | Including cell access information (cell selection parameters), other system information (Other System Information, OSI) scheduling information (other SIB scheduling information), and access restriction parameters | 160 | Downlink shared channel |
| SIB2 | Common parameters for cell reselection | Configured by using the SIB 1 | |
| SIB3 to SIB8 | Intra-frequency neighboring cell reselection information, inter-frequency neighboring cell reselection information, inter-RAT cell reselection information, earthquake and tsunami warning system (Earthquake and Tsunami Warning System, ETWS) primary notification information, ETWS secondary notification information, and commercial mobile alert service (Commercial Mobile Alert Service, CMAS) notification information | | |
| SIB9 | Global positioning system (Global Positioning System, GPS) & coordinated universal time (Coordinated Universal Time, UTC) information | | |

It should be understood that Table 1 is merely some simple descriptions of the SI for ease of understanding the SI. Improvements to specific content included in the SI are not described in this application. For detailed descriptions of the SI, refer to descriptions in a current protocol. Details are not described herein.

The terminal device first reads system information included in a SIB1, to obtain system information required for subsequent data transmission with the access network device. The information included in the SIB1 may be, for example, configuration information of a random access channel (RACH) or scheduling information corresponding to other SI.

It should be noted that, in different systems, names of the SIB1 may be different. For ease of description in this application, after the terminal device detects a PBCH sent by the access network device, to perform data transmission with the access network device, the terminal device first detects system information sent by the access network device. The system information is referred to as SIB1 information. For example, in the NR system, remaining minimum system information (RMSI) sent by the access network device may be understood as the SIB1.

6. The Terminal Device Detects the SIB1.

In an NR system, the SIB1 is carried on a physical downlink shared channel (PDSCH) and scheduled over a physical downlink control channel (PDCCH). Because of a large-bandwidth feature of the NR system, a frequency resource used for transmission of the PDCCH is configured by using information included in a PBCH. The frequency resource used for transmission of the PDCCH may be represented by using a frequency resource corresponding to a CORESET. The frequency resource and a time resource corresponding to the CORESET are indicated by using the information in the PBCH. For example, the time resource corresponding to the CORESET may be understood as being implemented by using a search space configuration. To be specific, in a current NR system, a master information block (master information block, MIB) carried on the PBCH includes information pdcch-ConfigSIB1. The information includes eight bits and is used to indicate configuration information of a CORESET for scheduling a SIB1. The configuration information of the CORESET includes a time-frequency resource and a frequency resource corresponding to the CORESET.

In addition, to facilitate understanding of embodiments of this application, the following several descriptions are provided.

First, in this application, "used to indicate" may include "used to directly indicate" and "used to indirectly indicate". When a piece of indication information is described as indicating A, the indication information may directly indicate A or indirectly indicate A, but it does not necessarily indicate that the indication information includes A.

Information indicated by the indication information is referred to as to-be-indicated information. In a specific implementation process, there are a plurality of manners of indicating the to-be-indicated information. For example, but not limited to, the to-be-indicated information may be directly indicated, for example, the to-be-indicated information or an index of the to-be-indicated information is indicated. Alternatively, the to-be-indicated information may be indirectly indicated by indicating other information, and there is an association relationship between the other information and the to-be-indicated information. Alternatively, only a part of the to-be-indicated information may be indicated, and the other part of the to-be-indicated information is already known or pre-agreed on. For example, specific information may alternatively be indicated by using an arrangement sequence of a plurality of pieces of information that is pre-agreed on (for example, specified in a protocol), to reduce indication overheads to some extent. In addition, a common part of all pieces of information may be further identified and indicated in a unified manner, to reduce indication overheads caused by separately indicating same information.

Second, it should further be understood that "first", "second", and various digital numbers (for example, "#1" and "#2") in this application are merely for differentiation for ease of description, for example, distinguishing between different information and different terminal devices, and are not intended to limit the scope of embodiments of this application.

Third, in this application, "preset" may include: being indicated by the network device by using signaling, or predefined, for example, defined in a protocol. "Pre-definition" may be implemented by prestoring corresponding code or a corresponding table in a device (for example, including the terminal device and the network device), or in another manner that may be used to indicate related information. A specific implementation is not limited in this application.

Fourth, "storage" in embodiments of this application may be storage in one or more memories. The one or more memories may be separately disposed, or may be integrated into an encoder, a translator, a processor, or a communication apparatus. Alternatively, a part of the one or more memories may be separately disposed, and a part of the one or more memories are integrated into the translator, the processor, or the communication apparatus. A type of the memory may be a storage medium in any form, and this is not limited in this application.

Fifth, a "protocol" in embodiments of this application may be a standard protocol in the communication field, for example, may include an LTE protocol, an NR protocol, and a related protocol applied to a future communication system. This is not limited in this application.

With reference to FIG. 1, the foregoing briefly describes scenarios to which the method for transmitting initial access configuration information provided in embodiments of this application can be applied, and describes basic concepts that may be used in embodiments of this application. With reference to the accompanying drawings, the following describes in detail the method for transmitting initial access configuration information provided in embodiments of this application.

It should be understood that the method for transmitting initial access configuration information provided in embodiments of this application may be applied to a system that uses a multi-antenna technology for communication, for example, the communication system 100 shown in FIG. 1. The communication system may include at least one network device and at least two types of terminal devices (the terminal device 121 and the terminal device 123 in FIG. 1 may be understood as different types of terminal devices). The network device and the terminal device may communicate with each other by using the multi-antenna technology.

It should be further understood that, a specific structure of an entity for performing the method provided in embodiments of this application is not particularly limited in the following embodiments, provided that the entity can run a program that records code of the method provided in embodiments of this application to perform communication according to the method provided in embodiments of this application. For example, the entity for performing the method provided in embodiments of this application may be the terminal device, the network device, or a functional module that is in the terminal device or the network device and that can invoke and execute the program.

Without loss of generality, interaction between a network device and a first terminal device is used as an example below to describe in detail the method for transmitting initial access configuration information provided in embodiments of this application.

FIG. 3(*a*) and FIG. 3(*b*) are a schematic flowchart of a method for transmitting initial access configuration information according to an embodiment of this application. Execution bodies in the flowchart include a first terminal device and a network device. FIG. 3 includes FIG. 3(*a*) and FIG. 3(*b*) for distinguishing between different manners of determining second information by the first terminal device. The following describes in detail method procedures shown in FIG. 3(*a*) and FIG. 3(*b*). Details are not described herein.

It should be understood that the method for transmitting initial access configuration information provided in this embodiment of this application may be applied to a communication system serving at least two types of terminal devices. For ease of description, the following describes an example in which the method for transmitting initial access configuration information is applied to a communication system serving two types of terminal devices (for example, the first terminal device and a second terminal device). When the method is applied to a communication system serving more than two types of terminal devices, functions of the different types of terminal devices in the communication system are similar to those of the first terminal device in the following embodiment. An application scenario is not described in detail in this application.

The method for transmitting initial access configuration information includes at least some of the following steps.

S310: The network device sends first information to the first terminal device.

The first information includes initial access configuration information corresponding to the second terminal device. The first terminal device and the second terminal device are different types of terminal devices.

It should be understood that before sending the first information to the first terminal device, the network device needs to generate the first information. In other words, the method procedure shown in FIG. 3(*a*) further includes S311: The network device generates the first information. How the network device generates the first information is not limited in this embodiment of this application. For details, refer to a solution to generating the first information by the network device in an initial access procedure in a current protocol, or refer to a stipulation in a future protocol. Details are not described herein.

In this application, that the first terminal device and the second terminal device are different types of terminal devices may be understood as follows:

The first terminal device is an NR-light terminal device, and the second terminal device is a non-NR-light terminal device (which is, for example, a terminal device of NR Release 15 and/or NR Release 16 or an evolved terminal device in a future wireless communication system, and is not limited to an LTE terminal device and an NR terminal device). The NR-light terminal device has a relatively low capability (for example, a relatively low capability such as a bandwidth capability, a transceiver antenna capability, and a transmit power capability). Alternatively, the first terminal device is a non-NR-light terminal device, and the second terminal device is an NR-light terminal device. Alternatively, a protocol version corresponding to the first terminal device is different from a protocol version corresponding to the second terminal device. For example, the first terminal device is a terminal device of NR Release 17 (or the first terminal device is a terminal device of a version later than NR Release 17), and the second terminal device is a terminal device of NR Release 15 or NR Release 16. In this application, a terminal device of NR Release 16 and a terminal device of a version earlier than NR Release 16 may also be referred to as NR-legacy terminal devices.

For ease of description, the following describes an example in which the first terminal device is an NR-light terminal device and the second terminal device is a non-NR-light terminal device.

In a possible implementation, the first terminal device and the second terminal device include at least one of the following differences:

The first terminal device and the second terminal device have different bandwidth capabilities (for example, the second terminal device can support data transmission with the network device on one carrier using a maximum of a 100 MHz frequency resource at the same time, but the first terminal device can support data transmission with the network device on one carrier using a maximum of a 20 MHz, 10 MHz, or 5 MHz frequency resource at the same time). The first terminal device and the second terminal device have different quantities of transmit and receive antennas (for example, the second terminal device can support 4R2T, but the first terminal device supports only 2R1T). The first terminal device and the second terminal device have different maximum uplink transmit powers (for example, the maximum uplink transmit power of the second terminal device may be 23 dBm or 26 dBm, but the maximum uplink transmit power of the first terminal device can be only one value from 4 dBm to 20 dBm). Alternatively, the first terminal device and the second terminal device correspond to different protocol versions (for example, the second terminal device is an NR terminal device corresponding to NR Release 15 or NR Release 16, but the first terminal device is an NR terminal device corresponding to NR Release 17). The first terminal device and the second terminal device support different carrier aggregation capabilities (for example, the second terminal device may support carrier aggregation, but the first terminal device does not support carrier aggregation; for another example, both the first terminal device and the second terminal device may support carrier aggregation, but a maximum quantity of carriers that can be aggregated at the same time by the second terminal device is greater than a maximum quantity of carriers that can be aggregated at the same time by the first terminal device, for example, the second terminal device may aggregate a maximum of five carriers or 32 carriers at the same time, and the first terminal device may aggregate a maximum of two carriers at the same time). The first terminal device and the second terminal device have different duplex capabilities (for example, the second terminal device supports full-duplex FDD, but the first terminal device supports only half-duplex FDD). The first terminal device and the second terminal device have different time capabilities for processing data (for example, a minimum delay between receiving downlink data by the second terminal device and sending a feedback on the downlink data by the second terminal device is less than a minimum delay between receiving downlink data by the first terminal device and sending a feedback on the downlink data by the first terminal device, and/or a minimum delay between sending uplink data by the second terminal device and receiving a feedback on the uplink data by the second terminal device is less than a minimum delay between sending uplink data by the first terminal device and receiving a feedback on the uplink data by the first terminal device). The first terminal device and the second terminal device have different processing capabilities (for example, the processing capability of the second terminal device is stronger than the processing capability of the first terminal device). The first terminal device and the second terminal device correspond to different peak transmission rates (for example, an uplink peak transmission rate corresponding to the second terminal device is higher than an uplink peak transmission rate corresponding to the first terminal device, and/or a downlink peak transmission rate corresponding to the second terminal device is higher than a downlink peak transmission rate corresponding to the first terminal device).

It should be understood that the foregoing differences between the first terminal device and the second terminal device are merely examples, and constitute no limitation on the protection scope of this application. How to determine that the first terminal device and the second terminal device are different types of terminal devices is not limited in this embodiment of this application. It may be determined based on a determining standard in a current protocol, or a determining standard in a future protocol. Details are not described herein.

Further, the bandwidth capabilities of the first terminal device and the second terminal device are not less than a transmission bandwidth corresponding to an SSB. In addition, CORESET configurations corresponding to type0-physical downlink control channel (PDCCH) common search space (CSS) sets determined by the first terminal device and the second terminal device based on a MIB sent by the network device are the same. The CORESET configuration includes a time domain resource configuration and a frequency domain resource configuration. The CORESET configuration may correspond to the first terminal device or the second terminal device. Alternatively, it may be understood that the first terminal device may interpret CORESET configuration information corresponding to the second terminal device.

In addition, it should be noted that the initial access configuration information in this embodiment of this application includes related configuration information that is used for initial access and that is obtained by the terminal device before the terminal device enters a connected state. For example, the related configuration information is broadcast information that is sent by the network device and that is received by the terminal device when the terminal device is in an idle state or an inactive state. Specifically, the initial access configuration information includes SIB1 information or other system information SI corresponding to the terminal device; or the initial access configuration information includes corresponding SIB1 information or other SI control information used for scheduling the terminal device.

It should be understood that, in this application, specific content of the initial access configuration information that corresponds to the second terminal device and that is included in the first information is not described in detail. Reference may be made to an information type and usage that are specifically included in initial access configuration information and that are defined in a current protocol. Similarly, specific content of the initial access configuration information that corresponds to the second terminal device and that is included in the second information is not described in detail, either. The following describes, by using an example, how the first terminal device determines the second information based on the first information when the first information is a different type of information. Details are not described herein.

Specifically, the second terminal device can also receive the first information sent by the network device. After the first terminal device and the second terminal device receive the first information sent by the network device, because the first information includes the initial access configuration information corresponding to the second terminal device, the second terminal device can obtain, based on the first information, system information that adapts to the second terminal device, to support subsequent data transmission with the network device. For the first terminal device, the first terminal device may determine the second information based on the first information, where the second information includes initial access configuration information corresponding to the first terminal device. In other words, the method procedure shown in FIG. 3(a) further includes S320: The first terminal device determines the second information.

Figure 3A:
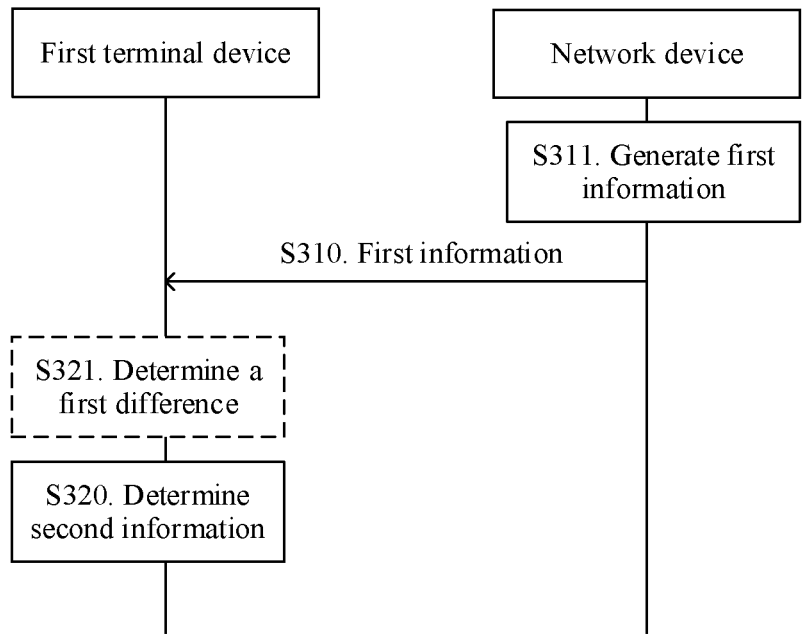
FIG. 3(a) and FIG. 3(b) are schematic flowcharts of a method for transmitting initial access configuration information according to embodiments of this application.

According to the method for transmitting initial access configuration information shown in FIG. 3(a), the first terminal device may obtain, based on a relationship between the second information required by the first terminal device and the first information of the second terminal device, the second information required by the first terminal device. In this way, the network device side does not need to specially send the second information to the first terminal, so that signaling is saved, and requirements of a plurality of types of terminal devices on initial access configuration information in different scenarios are met.

Optionally, when the first information includes only the initial access configuration information corresponding to the second terminal device, the first terminal device may determine specific content of the second information based on the first information. In other words, the network device does not need to separately send, to different types of terminal devices, initial access configuration information associated with the terminal devices, so that signaling overheads on the network device side are reduced. In addition, the different types of terminal devices may separately obtain the initial access configuration information corresponding to the different types of terminal devices. Therefore, the network device can perform differentiated design on the initial access configuration information corresponding to the different types of terminal devices, so that transmission requirements of the different types of terminal devices can be met, and data transmission efficiency of a system can be improved.

The initial access configuration information corresponding to the second terminal device includes initial access configuration information of the second terminal device, and may also include other configuration information of the second terminal device. A first correspondence exists between the other configuration information of the second terminal device and the initial access configuration information of the second terminal device. To be specific, after learning of the other configuration information, the second terminal device can learn of the initial access configuration information of the second terminal device based on the first correspondence and the other configuration information.

Similarly, the initial access configuration information corresponding to the first terminal device includes initial access configuration information of the first terminal device, and may also include other configuration information of the first terminal device. A second correspondence exists between the other configuration information of the first terminal device and the initial access configuration information of the first terminal device. To be specific, after learning of the other configuration information, the first terminal device can learn of the initial access configuration information of the first terminal device based on the second correspondence and the other configuration information.

It should be understood that, in this embodiment of this application, there are the following possibilities that the first terminal device determines, after receiving the first information, to obtain the second information based on the first information:

Possibility 1: Preset. The first terminal device determines, based on a capability type of the first terminal device, to obtain, based on the first information, the second information corresponding to the first terminal device. For example, the first terminal device corresponds to a terminal device type, and the terminal device type is different from a terminal device type corresponding to eMBB or URLLC, and for another example, if the first terminal device supports a bandwidth of 5 M, 10 M, or 20 M, and the second terminal device supports a bandwidth of 100 M, the first terminal device can determine, based on a capability of the first terminal device, to obtain the second information.

Possibility 2: Triggered based on a trigger condition. After the first terminal device accesses a network, if a channel resource bandwidth indicated by the first information does not match a bandwidth that can be supported by the first terminal device, the first terminal device needs to obtain, based on the first information, the second information corresponding to the first terminal device. For example, if a downlink initial BWP bandwidth indicated by the first information is 100 M, and a bandwidth that can be supported by the first terminal device is 5 M, the first terminal device may obtain the second information based on the first information.

Possibility 3: Indicated based on the network device. After the first terminal device accesses a network, the network device indicates the first terminal device to obtain the second information based on the first information. For example, the first terminal device and the second terminal device are terminal devices corresponding to different NR releases (where the first terminal device is a terminal device of NR Release 17 or a version later than NR Release 17, and the second terminal device is a terminal device of NR Release 16 or NR Release 15). In consideration of load balancing or the like, the network device may indicate, by using indication information, the first terminal device to obtain the second information based on the first information, to obtain initial access configuration information different from that of the second terminal device, so that load balancing is implemented. The load balancing herein may include, for example, load balancing of paging messages and load balancing of RACH access.

It should be understood that Possibilities 1 to 3 are merely examples, and several possible manners for the first terminal device to determine to obtain the second information based on the first information are provided, so that flexibility of the solution is improved. The possibilities do not constitute any limitation on the protection scope of this application. The first terminal device may determine, in another possible manner, to obtain the second information based on the first information. Details are not described herein.

The first terminal device determines the second information based on the first information in the following several manners:

Manner 1:

The first terminal device determines the second information based on the first information and a first offset. It may be understood that S320 in which the first terminal device determines the second information means that the first terminal device determines the second information based on the first information and the first offset.

In a possible implementation, some information of the second information is determined based on the first information and the first offset. In this implementation, some other information that is in the second information and that is not determined based on the first information and the first offset may reuse a same configuration of the first information (for example, a second time domain resource in the second information may reuse a first time domain resource in the first information), or some other information in the second information may be additionally indicated on a channel of the first information (for example, the second time domain resource in the second information is indicated by using fourth indication information in the first information). This is not limited in this application.

Specifically, when the first information includes the initial access configuration information corresponding to the second terminal device and a part of the second information, the first terminal device may obtain, based on the first information, the part of the second information carried in the first information, and determine, based on the first offset, another part of the second information that is not carried in the first information.

In another possible implementation, all information of the second information is determined based on the first information and the first offset. In this implementation, the first terminal device may obtain all information of the second information based on the initial access configuration information that corresponds to the second terminal device and that is included in the first information and the first offset.

In still another possible implementation, the first offset may further indicate that content of the second information is the same as content of the first information. In some specific conditions (for example, an RRM measurement result corresponding to the first terminal device is high), the first terminal device may directly determine, based on the first information, the initial access configuration information corresponding to the first terminal device.

In still another possible implementation, when the first information includes the initial access configuration information corresponding to the second terminal device and the initial access configuration information corresponding to the first terminal device, the first terminal device may obtain, based on the first information, a part of initial access configuration information that corresponds to the first terminal device and that is carried in the first information.

The foregoing possible implementations briefly describe a plurality of possibilities that the first terminal device determines the second information based on the first information and the first offset, so that a flexible selection solution is provided for the first terminal device to determine the second information based on the first information and the first offset.

In a possible implementation, the first offset is predefined.

In another possible implementation, the first offset is associated with at least one of the following parameters: an index corresponding to a synchronization signal block SSB, a synchronization raster corresponding to the SSB, a frequency band occupied by the SSB, a radio resource management RRM measurement result corresponding to the SSB, a capability of the first terminal device, or control information included in a master information block MIB, where the SSB and the first information or the second information meet a quasi-colocation QCL relationship, and the MIB is information carried on a physical broadcast channel PBCH included in the SSB. An association relationship between the first offset and the foregoing parameter is predefined.

In this implementation, optionally, before S320, the first terminal device determines the first offset based on the association relationship and at least one of the foregoing parameters. In this case, the method procedure shown in FIG. 3(a) further includes S321: The first terminal device determines the first offset.

For example, a plurality of first offsets are predefined in a protocol, and the first terminal device can determine an appropriate first offset based on the foregoing one or more parameters and the association relationship. Optionally, an association relationship between the plurality of first offsets and the parameters is an association relationship predefined in a protocol and stored locally in the first terminal device.

The following describes the foregoing parameters in detail.

(1) Index corresponding to the SSB (for example, a time index or an index): The SSB is an SSB that meets a quasi-colocation (QCL) relationship with the first information or the second information. The first terminal device may determine a time location of the SSB based on an SSB time index. In this application, it may be considered that the SSB time index is equivalent to an SSB index, that is, different SSB indexes correspond to different SSB time indexes. Generally, to ensure that all terminal devices that detect different SSBs can detect access network device configuration information corresponding to the terminal devices, the different SSBs are associated with one piece of first information. When the first terminal device detects the first information, the first information is associated with one SSB, and the first terminal device may determine the first offset between the first information and the second information based on the associated SSB.

(2) Synchronization raster corresponding to the SSB: Frequency locations corresponding to SSBs detected by the first terminal device are different, and the first offset between the first information and the second information may be different. The frequency location corresponding to the SSB may be represented by a sync raster, and the SSB is an SSB that meets a QCL relationship with the first information or the second information.

(3) Frequency band in which the SSB is located: A first offset between a first MCS and a second MCS is used as an example. If a frequency band in which a detected SSB is located is lower than 3 GHz, the difference between the first MCS and the second MCS may be MCS-delta1. If a frequency band in which a detected SSB is located is higher than 3 GHz and lower than 6 GHz, the difference between the first MCS and the second MCS may be MCS-delta2. If a frequency band in which a detected SSB is located is higher than 6 GHz, the difference between the first MCS and the second MCS may be MCS-delta3. At least two values of MCS-delta1, MCS-delta2, and MCS-delta3 are different from each other. Further, preferably, MCS-delta1<MCS-delta2<MCS-delta3. Generally, a lower frequency band indicates a larger coverage area. Therefore, in a low frequency band, the difference between the first MCS and the second MCS may be small, and basically does not affect the coverage area of the first terminal device. However, when the frequency band becomes higher, the coverage area decreases. In this case, the first terminal device needs a smaller MCS to compensate for a decrease in the coverage area caused by low costs (for example, a low bandwidth capability and a decrease in a quantity of transmit and receive antennas). Therefore, as the frequency band increases, an offset (namely, the first offset) between the first MCS and the second MCS may increase, to compensate for the decrease in the coverage area of the first terminal device caused by low costs.

(4) A difference between the content of the first information and the content of the second information is determined based on a radio resource management (radio resource management, RRM) measurement result obtained by using the SSB. The RRM measurement result herein may include a reference signal received power (RSRP) and reference signal received quality (RSRQ).

Optionally, a larger RRM measurement result indicates a smaller difference between the content of the first information and the content of the second information. This is because if the RRM measurement result is large, it indicates that a state of a channel between the network device and the first terminal device is good. In this case, the content of the second information may be similar to the content of the first information, or even may be the same as the content of the first information.

Optionally, if the RRM measurement result is small, it indicates that a state of a channel between the network device and the first terminal device is poor. In this case, the content of the second information differs greatly from the content of the first information. In this way, coverage of the first terminal device can be ensured.

Optionally, in this application, the RRM measurement result may alternatively be determined based on another reference signal. This is not specifically limited in this application.

(5) The first terminal device determines the first offset between the content of the first information and the content of the second information based on a capability of the first terminal device. For example, the first offset between the content of the first information and the content of the second information is determined based on a bandwidth. The determined first offset varies with the bandwidth. The determined first offset between the first terminal device with a high bandwidth and the second terminal device may be smaller than the determined first offset between the first terminal device with a low bandwidth and the second terminal device. This is because a capability of the first terminal device with a high bandwidth is closer to a capability of the second terminal device, and the first offset does not need to be excessively large; and a capability of the first terminal device with a low bandwidth is far from the capability of the second terminal device, and the first offset may be large.

(6) The first terminal device may alternatively determine the first offset between the first information and the second information based on different control information included in the MIB information carried on the PBCH. For example, a control field included in the MIB has X states in total, and may indicate a maximum of X different configurations. Correspondingly, the X different configurations may indicate X different first offsets, where X is an integer not less than 1.

The foregoing possible implementations describe, by using examples, how to obtain the first offset. If the first offset is predefined, a convenient implementation is provided for determining the first offset. If the first offset may be determined based on some parameters that are known before the first terminal device completes initial access, the first terminal device may select an appropriate first offset based on the known parameters, so that flexibility of determining the first offset is improved. It should be understood that the two possible implementations are merely examples, and do not constitute any limitation on the protection scope of this application. The first offset may alternatively be determined in another manner, for example, may be randomly determined by the first terminal device.

Specifically, in Manner 1, when the first information includes first control information, the second information includes second control information, that is, when the initial access configuration information corresponding to the second terminal device is the first control information, the initial access configuration information corresponding to the first terminal device is the second control information. The first control information is for scheduling first system information corresponding to the second terminal device, and the second control information is for scheduling second system information corresponding to the first terminal device.

Alternatively, when the first information includes first system information corresponding to the second terminal device, the second information includes second system information corresponding to the first terminal device, that is, when the initial access configuration information corresponding to the second terminal device is the first system information, the initial access configuration information corresponding to the first terminal device is the second system information. That is, in Manner 1, types of the first information and the second information are consistent, and a possible representation form is provided for specific types of the first information and the second information.

Further, the first control information includes at least one of the following information:
 a first frequency domain resource occupied for transmitting the first system information, a first time domain resource occupied for transmitting the first system information, a first modulation and coding scheme MCS for transmitting the first system information, a first redundancy version RV for transmitting the first system information, or a first indicator for distinguishing a type of the first system information.

Similarly, the second control information includes at least one of the following information:
 a second frequency domain resource occupied for transmitting the second system information, a second time domain resource occupied for transmitting the second system information, a second MCS for transmitting the second system information, a second RV for transmitting the second system information, or a second indicator for distinguishing a type of the second system information.

In this embodiment of this application, the first control information may include a plurality of types of information, and the second control information may include a plurality of types of information. A flexible solution to selecting the first control information and the second control information is provided.

The first indicator for distinguishing the type of the first system information may be understood as: The first indication is used to indicate a type or types of system information associated with the first system information. The types of the system information may include a SIB1, a SIB2, a SIB3, and the like. For example, the first indication may indicate that the current first system information is associated with the SIB1, or indicate that the current first system information is associated with system information other than the SIB1. In this application, that the first system information is associated with the SIB1 may be understood as follows: The first system information includes control information for scheduling the SIB1, or the first system information includes the SIB1 or is the SIB1. It is the same case for first system information associated with another type of system information. Details are not described. It is the same case for the second indication. Details are not described.

The first system information includes first SIB1 information or other first SI corresponding to the second terminal device. The first SIB1 information may be understood as system information included in a first SIB1, and the other first SI is system information that corresponds to the second terminal device and that is other than the system information included in the first SIB1.

Specifically, when the first system information is the first SIB1 information, the first control information is control information for scheduling the first SIB1 information. For example, the first control information is a frequency resource occupied for transmitting the first SIB1 information, a time domain resource occupied for transmitting the first SIB1 information, a modulation and coding scheme (MCS) for transmitting the first SIB1 information, a redundancy version (RV) for transmitting the first SIB1 information, an indicator (system information indicator) for distinguishing a type of the first SIB1 information, or other control information for scheduling the first SIB1 information. Details are not described herein. Similarly, when the first system information is the first SI information, the first control information is control information for scheduling the first SI information. For example, the first control information is a frequency resource occupied for transmitting the first SI information, a time domain resource occupied for transmitting the first SI information, an MCS for transmitting the first SI information, an RV for transmitting the first SI information, an indicator for distinguishing a type of the first SI, or other control information for scheduling the first SI information. Details are not described herein.

Optionally, when the first information is the first control information, the first terminal device and the second terminal device may receive the first information through a PDCCH.

Optionally, when the first information is the first system information, the first terminal device and the second terminal device may receive the first information through a PDSCH.

It may be understood that, when the first information is the first control information, the first terminal device and the second terminal device may alternatively receive the first information through a PDSCH, or when the first information is the first system information, the first terminal device and the second terminal device may alternatively receive the first information through a PDCCH. How the first terminal device and the second terminal device receive the first information is not limited in this application. For details, refer to a stipulation in a current protocol, or refer to a stipulation in a future protocol. For example, when the first information is carried on a control channel, the control channel may be another channel that is newly defined in a future communication protocol and that has a same or similar function as a downlink control channel. A type and a name of the control channel are not limited in this application. For ease of description, a PDCCH is used as an example of the control channel for description in this application.

Specifically, a time-frequency resource configuration and a search space configuration corresponding to the PDCCH carrying the first information may be indicated by using an MIB carried in a synchronization information block corresponding to the first information. For example, pdcch-ConfigSIB1 included in the MIB indicates the time-frequency resource configuration and the search space configuration corresponding to the PDCCH carrying the first information.

How the first terminal device receives the first information is not limited in this embodiment of this application.

The second system information includes second SIB1 information or other second SI corresponding to the first terminal device. The second SIB1 information may be understood as system information included in a second SIB1, and the other second SI is system information corresponding to another second terminal device other than the system information included in the second SIB1.

Specifically, when the second system information is the second SIB1 information, the second control information is control information for scheduling the second SIB1 information. For example, the second control information is a frequency resource occupied for transmitting the second SIB1 information, a time domain resource occupied for transmitting the second SIB1 information, an MCS for transmitting the second SIB1 information, an RV for transmitting the second SIB1 information, an indicator (system information indicator) for distinguishing a type of the second SIB1 information, or other control information for scheduling the second SIB1 information. Details are not described herein. Similarly, when the second system information is the second SI information, the second control information is control information for scheduling the second SI information. For example, the second control information is a frequency resource occupied for transmitting the second SI information, a time domain resource occupied for transmitting the second SI information, an MCS for transmitting the second SI information, an RV for transmitting the second SI information, an indicator for distinguishing a type of the second SI, or other control information for scheduling the second SI information. Details are not described herein.

It should be understood that in this embodiment, types of the first information and the second information are the same. If the first information indicates a first system information type, that is, a system information type corresponding to data transmission performed based on the first information is SIB1 information or other SI, the second information may also indicate the system information type. If the first information indicates mapping from a virtual resource block (VRB) to a physical resource block (PRB), the second information may also indicate mapping from a VRB to a PRB, and the first information and the second information indicate a same type.

For example, if the first information is the first control information, the second information is the second control information; or if the first information is the first system information, the second information is the second system information.

For example, when the first control information is the first time domain resource, and the second control information is the second time domain resource, the first offset includes a time domain offset between a start moment of the first time domain resource and a start moment of the second time domain resource and/or a difference between a time length of the first time domain resource and a time length of the second time domain resource.

The time domain offset and/or the time length difference may be represented by using a quantity of orthogonal frequency division multiplexing (orthogonal frequency division multiplexing, OFDM) symbols, may be represented by using a quantity of slots, or may be represented in another form. This is not limited in this application.

It should be noted that, in this application, the start moment of the first time domain resource in time domain and the start moment of the second time domain resource in time domain may be in a same slot, or may be in different slots; the start moment of the second time domain resource in time domain may be before or after the start moment of the first time domain resource in time domain, or the two start moments may be a same start moment. This is not limited in this application.

Optionally, the start moment of the first time domain resource in time domain and the start moment of the second time domain resource in time domain are at same locations in slots in which the first time domain resource and the first time domain resource are located, and/or the time length of the first time domain resource may be the same as the time length of the second time domain resource.

Specifically, when the first offset indicates only the time domain offset between the start moment of the first time domain resource and the start moment of the second time domain resource, the first terminal device may reuse the length of the first time domain resource as the length of the second time domain resource, the first terminal device may determine the length of the second time domain resource based on a predefined length of a time domain resource, or the first terminal device may determine the length of the second time domain resource by using other indication information. This is not limited in this application.

Similarly, when the first offset indicates only the difference between the length of the first time domain resource and the length of the second time domain resource, the first terminal device may reuse the start moment of the first time domain resource as the start moment of the second time domain resource, or the first terminal device may determine the start moment of the second time domain resource in another manner. Details are not described herein.

Optionally, in this embodiment of this application, the association relationship between the first time domain resource and the second time domain resource may be alternatively indicated in another manner. For example, the first offset indicates a time domain offset between an end moment of the first time domain resource and an end moment of the second time domain resource. For another example, a time domain resource occupied by the first time domain resource in time domain is S1-S2, and a time domain resource occupied by the second time domain resource in time domain is S3-S4. The association relationship between the first time domain resource and the second time domain resource may be indicated by indicating a size relationship between S1 and S3 and/or a size relationship between S2 and S4.

Specifically, in a current NR system, the terminal device may detect, in two contiguous slots, whether there is SIB1 control information or other SI control information. To be specific, the terminal device determines whether there is transmission of a PDCCH scrambled by a system information radio network temporary identifier (SI-RNTI).

Optionally, if the first terminal device detects the first information in a first slot of two contiguous slots, the first terminal device may determine that the start moment of the second time domain resource in time domain is in a second slot of the two contiguous slots. Alternatively, it may be understood as that the network device separately sends the first information and the second information in the two slots, and the two slots are adjacent.

Optionally, if the first terminal device detects the first information in the second slot of the two contiguous slots, it may be determined that a slot offset between the start moment of the second time domain resource in time domain and the start moment of the first time domain resource in time domain is 5 ms or another value. For example, the slot offset is X slots. A length of each slot may be associated with a subcarrier spacing (SCS) of the first control information, may be associated with a subcarrier spacing of the second control information, may be associated with a subcarrier spacing of the first system information, or may be associated with a subcarrier spacing of the second system information. For example, when the subcarrier spacing of the first control information is 15 kHz, a length of one slot is 1 ms. When the subcarrier spacing of the first control information is 30 kHz, a length of one slot is 0.5 ms.

Optionally, in this application, the slot offset may be a difference between a slot index of a first slot in which the start moment of the first time domain is located and a slot index of a second slot in which the start moment of the second time domain resource is located. If the first slot and the second slot are located in different radio frames but correspond to a same slot index, the difference further needs to include a difference between indexes corresponding to the radio frames.

Figure 4A:
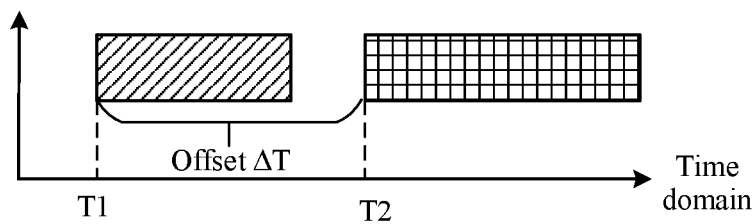
FIG. 4(a) to FIG. 4(c) are schematic diagrams of a type of first offset according to an embodiment of this application.
Figure 4B:
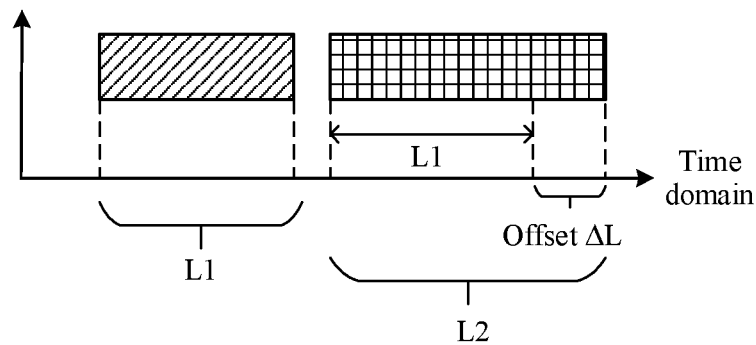
Figure 4C:
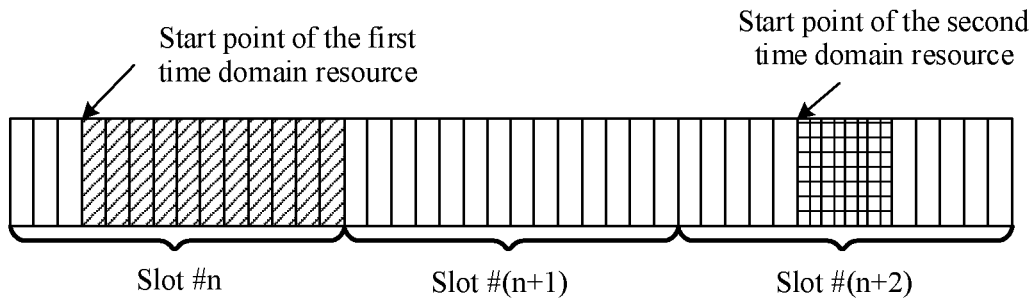

FIG. 4(a) to FIG. 4(c) are a schematic diagram of a type of first offset according to an embodiment of this application.

It can be learned from FIG. 4(a) that the offset between the start moment (T1 in the figure) of the first time domain resource in time domain and the start moment (T2 in the figure) of the second time domain resource in time domain is $\Delta T$ (T2-T1 in the figure).

t can be learned from FIG. 4(b) that the difference between the time length (L1 in the figure) occupied by the first time domain resource in time domain and the time length (L2 in the figure) occupied by the second time domain resource in time domain is $\Delta L$ (L2-L1 in the figure).

It can be learned from FIG. 4(c) that the offset between the start moment of the first time domain resource in time domain (the fourth symbol of slot #n in the figure) and the start moment of the second time domain resource in time domain (the sixth symbol of slot #n+2 in the figure) includes two slots and two OFDM symbols.

In a possible implementation, when the end moment of the first time domain resource is earlier than or equal to a preset moment, the start moment of the first time domain resource and the start moment of the second time domain resource are located in a same slot; or when the end moment of the first time domain resource is later than a preset moment, the start moment of the first time domain resource and the start moment of the second time domain resource are located in different slots.

It should be understood that the foregoing solution to determining, based on a time relationship between the end moment of the first time domain resource and the preset moment, whether the start moment of the first time domain resource and the start moment of the second time domain resource are in a same slot may be applied to another scenario and another solution, or may be separately implemented. This is not limited in this application.

Specifically, the preset moment is an (N/2)th OFDM symbol in a slot. N indicates a quantity of OFDM symbols included in one slot. For example, when a subcarrier spacing is 15 kHz, one slot includes 14 OFDM symbols, or when the subcarrier spacing is 30 kHz, one slot includes 28 OFDM symbols. In this embodiment of this application, a specific quantity of symbols included in one slot is not limited. For details, refer to a stipulation in a current protocol.

Specifically, when it is determined that the start moment of the first time domain resource and the start moment of the second time domain resource are located in a same slot, it may be further determined that the start moment of the second time domain resource is located in an $M^{th}$ symbol in the slot, where M=N'+L. N' and L may be preconfigured. For example, N' may represent the start moment of the first time domain resource, and L may be understood as the first offset between the start moment of the second time domain resource and the start moment of the first time domain resource. The start moment of the first time domain resource may be represented by using a location of an OFDM symbol in a slot. Alternatively, N' may represent a preset moment, and L may be understood as a difference between the start moment of the second time domain resource and the preset moment. Alternatively, a value of N' may be equal to N/2. In this case, L may be 1, or L may be an integer greater than 0 and less than N/2.

Figure 5A:
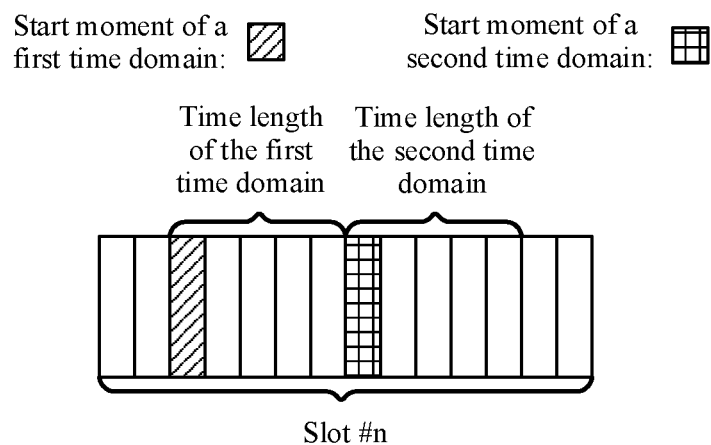
FIG. 5(a) and FIG. 5(b) are schematic diagrams of location relationships between a first time domain resource and a second time domain resource according to an embodiment of this application.
Figure 5B:
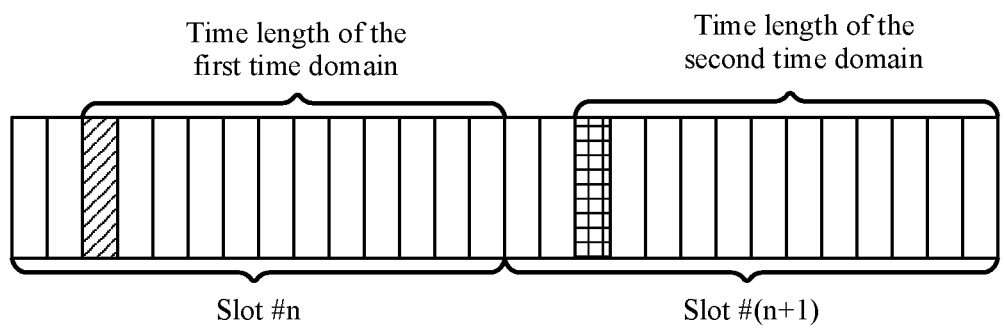

An example in which one slot includes 14 OFDM symbols is used for description. FIG. 5(a) and FIG. 5(b) are schematic diagrams of location relationships between a first time domain resource and a second time domain resource according to an embodiment of this application.

It can be learned from FIG. 5(a) that the start moment of the first time domain resource may be represented by using the third OFDM symbol in one slot, and the end point of the first time domain resource may be represented by using the seventh OFDM symbol in one slot. In other words, the time length of the first time domain resource is five OFDM symbols. The first terminal device may determine, based on the first information and the first offset, that the start moment of the second time domain resource is the eighth OFDM symbol in the slot, and the time length of the second time domain resource may be the same as the time length of the first time domain resource. In FIG. 5(a), a preset correspondence M=N'+L may be understood as N'=N/2=7, and L=1.

Specifically, when it is determined that the start moment of the first time domain resource and the start moment of the second time domain resource are located in different slots, it may be further determined that the start moment of the second time domain resource is located in a next slot or a previous slot of the slot in which the start moment of the first time domain resource is located.

It can be learned from FIG. 5(b) that the start moment of the first time domain resource may be represented by using the third OFDM symbol in one slot, and the end point of the first time domain resource may be represented by using the fourteenth OFDM symbol in one slot. The first terminal device may determine, based on the first information and the first offset, that the start moment of the second time domain resource is in a next slot, and the start moment and the time length of the second time domain resource may be the same as the start moment and the time length of the first time domain resource.

It should be understood that the preset moment may alternatively be another preconfigured value, for example, a value of the quantity of OFDM symbols included in one slot. It should be further understood that a combination of the start moment of the first time domain resource and the time length of the first time domain resource may represent a time resource corresponding to transmission of system information that corresponds to the second terminal device and that is sent by the network device. Similarly, a combination of the start moment of the second time domain resource and the time length of the second time domain resource may represent a time resource corresponding to transmission of system information that corresponds to the first terminal device and that is sent by the network device. In addition, the first time domain resource may alternatively be jointly represented by using a start point of the first time domain resource and an end point of the first time domain resource. Similarly, the second time domain resource may alternatively be jointly represented by using a start point of the second time domain resource and an end point of the second time domain resource.

For example, when the first control information is the first frequency domain resource, and the second control information is the second frequency domain resource,
the first offset includes a frequency domain offset between a start point of the first frequency domain resource and a start point of the second frequency domain resource and/or a difference between a size of the first frequency domain resource and a size of the second frequency domain resource.

If the first information indicates the first frequency domain resource occupied for transmitting the first system information (for example, a frequency domain resource occupied for transmitting the first SIB1 or a frequency domain resource occupied for transmitting the first SI),
optionally, the first offset may be the offset between the start point of the first frequency domain resource in frequency domain occupied for transmitting the first system information and the start point of the second frequency domain resource in frequency domain occupied for transmitting the second system information. FIG. 6(a) to FIG. 6(d) are schematic diagrams of another type of first offset according to this application.

Figure 6A:
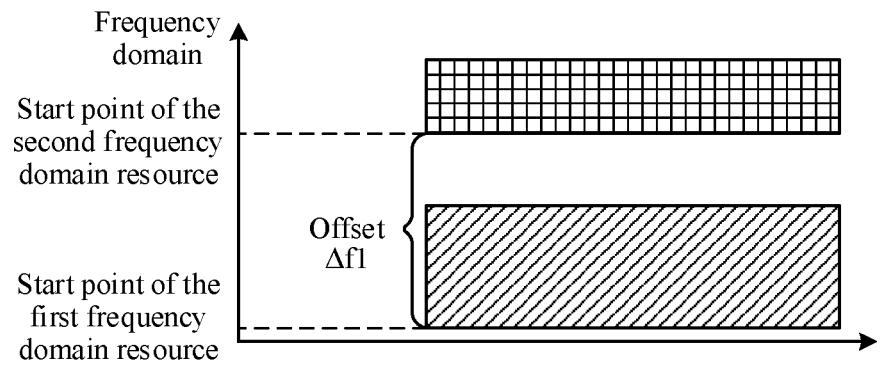
FIG. 6(a) to FIG. 6(d) are schematic diagrams of another type of first offset according to an embodiment of this application.

It can be learned from FIG. 6(a) that the offset that is indicated by the first information and that is between the start point of the first frequency domain resource in frequency domain occupied for transmitting the first system information and the start point of the second frequency domain resource in frequency domain occupied for transmitting the second system information is Δf1.

Optionally, the first offset may be a difference between a size of a frequency domain resource occupied in frequency domain by the first frequency domain resource occupied for transmitting the first system information and a size of a frequency domain resource occupied in frequency domain by the second frequency domain resource occupied for transmitting the second system information.

Figure 6B:
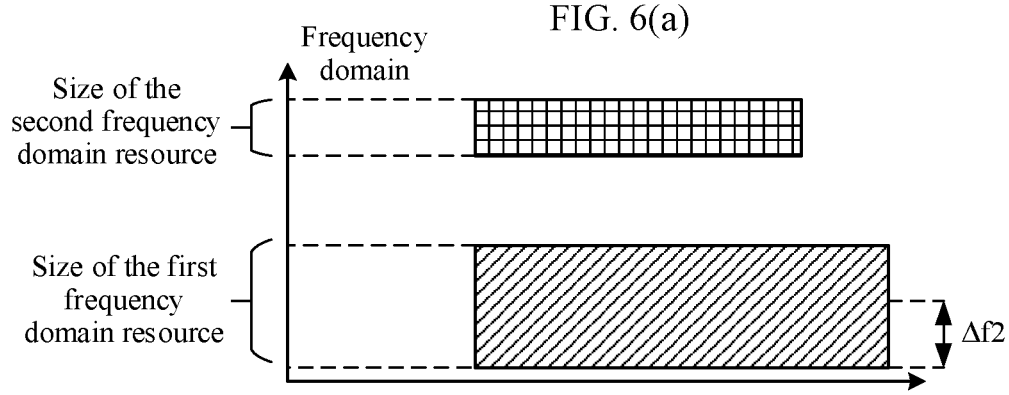

It can be learned from FIG. 6(b) that the difference between the size of the frequency domain resource occupied in frequency domain by the first frequency domain resource occupied for transmitting the first system information and the size of the frequency domain resource occupied in frequency domain by the second frequency domain resource occupied for transmitting the second system information is Δf2.

Figure 6C:
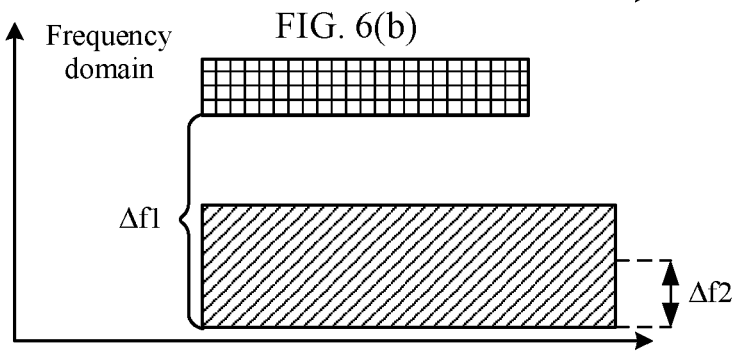

Optionally, the first offset may be the offset between the start point of the first frequency domain resource in frequency domain occupied for transmitting the first system information and the start point of the second frequency domain resource in frequency domain occupied for transmitting the second system information, and the difference between the size of the frequency domain resource occupied in frequency domain by the first frequency domain resource occupied for transmitting the first system information and the size of the frequency domain resource occupied in frequency domain by the second frequency domain resource occupied for transmitting the second system information, as shown in FIG. 6(c).

Figure 6D:
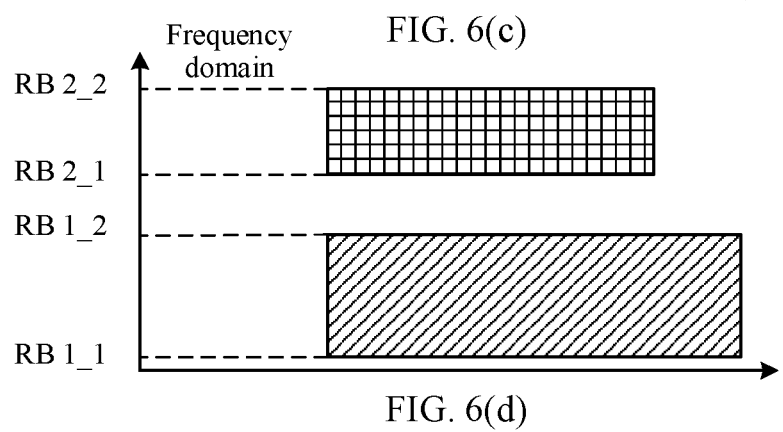

Optionally, the first offset may be a third correspondence between the first frequency domain resource occupied for transmitting the first system information and the second frequency domain resource occupied for transmitting the second system information. For example, the first frequency domain resource occupied for transmitting the first system information is represented as RB1_1 and RB1_2, and the second frequency domain resource occupied for transmitting the second system information may be represented as RB2_1 and RB2_2; or the first frequency domain resource occupied for transmitting the first system information is represented as RB1_3 and RB1_4, and the second frequency domain resource occupied for transmitting the second system information may be represented as RB2_3 and RB2_4. RB1_1 may be equal to RB1_2, or RB1_1 may be less than RB1_2. RB2_1 may be equal to RB2_2, or RB2_1 may be less than RB2_2. Similar relationships exist between RB1_3 and RB1_4, and between RB2_3 and RB2_4. Details are not described, as shown in FIG. 6(d).

Specifically, the frequency offset may be represented by a quantity of resource blocks (RBs), or may be represented by a quantity of resource block groups (RBGs). A quantity of RBs included in one RBG may be associated with a bandwidth including the first information. The bandwidth including the first information may be an initial BWP bandwidth corresponding to the second terminal device, may be understood as a bandwidth corresponding to a frequency resource indicated by Type0-PDCCH in a MIB, or may be associated with a bandwidth including the second information. The bandwidth including the second information may be an initial BWP bandwidth corresponding to the first terminal device. In this application, the initial BWP corresponding to the first terminal device may be the same as an initial BWP corresponding to the second terminal device, or the initial BWP bandwidth corresponding to the first terminal device may be different from an initial BWP bandwidth corresponding to the second terminal device.

Optionally, in this embodiment of this application, the association relationship between the first frequency domain resource and the second frequency domain resource may be alternatively indicated in another manner. For example, the first offset indicates a time domain offset between an end location of the first frequency domain resource and an end location of the second frequency domain resource. For another example, frequency domain resources occupied by the first frequency domain resource in frequency domain are F1-F2, and frequency domain resources occupied by the second frequency domain resource in frequency domain are F3-F4. An association relationship between the first frequency domain resource and the second frequency domain resource may be indicated by indicating a size relationship between F1 and F3 and/or a size relationship between F2 and F4.

Optionally, when a size of the first frequency domain resource is less than a first preset threshold, the start moment of the first time domain resource and the start moment of the second time domain resource are located in a same slot;
  when a size of the first frequency domain resource is greater than a first preset threshold, the start moment of the first time domain resource and the start moment of the second time domain resource are located in different slots; or
  when a size of the first frequency domain resource is equal to a first preset threshold, the start moment of the first time domain resource and the start moment of the second time domain resource are located in different slots, or the start moment of the first time domain resource and the start moment of the second time domain resource are located in a same slot.

If the size of the first frequency domain resource is less than a threshold, the first time domain resource and the second time domain resource are in a same slot. If the size of the first frequency domain resource is greater than a threshold, the first time domain resource and the second time domain resource are in different slots. If the size of the first frequency domain resource is equal to a threshold, the first time domain resource and the second time domain resource may be in different slots, or may be in a same slot.

It should be understood that the foregoing solution to determining, based on the size relationship between the size of the first frequency domain resource and the first preset threshold, whether the start moment of the first time domain resource and the start moment of the second time domain resource are in a same slot may be applied to another scenario and another solution, or may be separately implemented. This is not limited in this application.

Figure 7A:
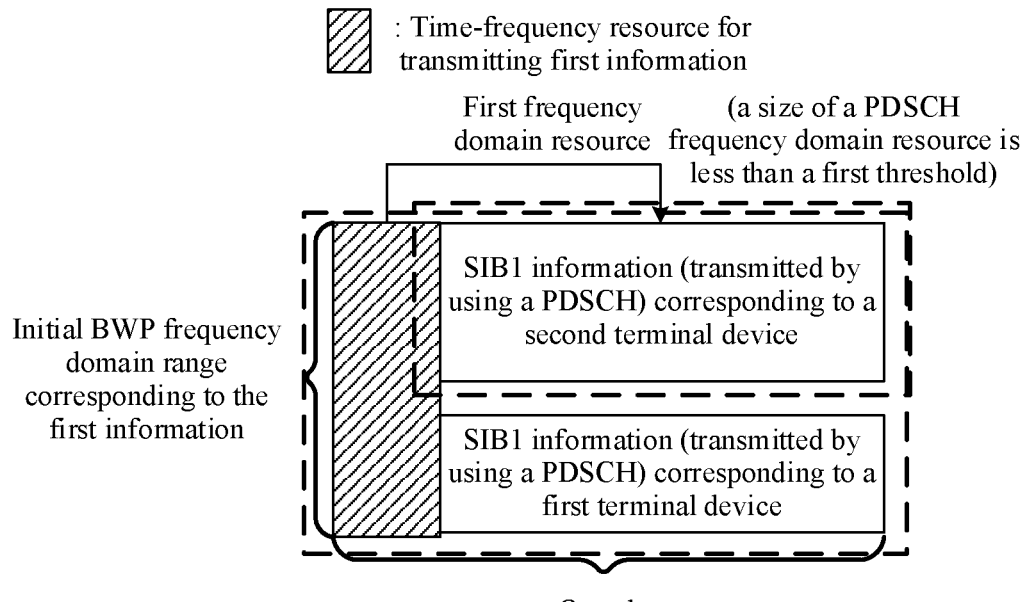
FIG. 7(a) and FIG. 7(b) are schematic diagrams of resources according to this application.
Figure 7B:
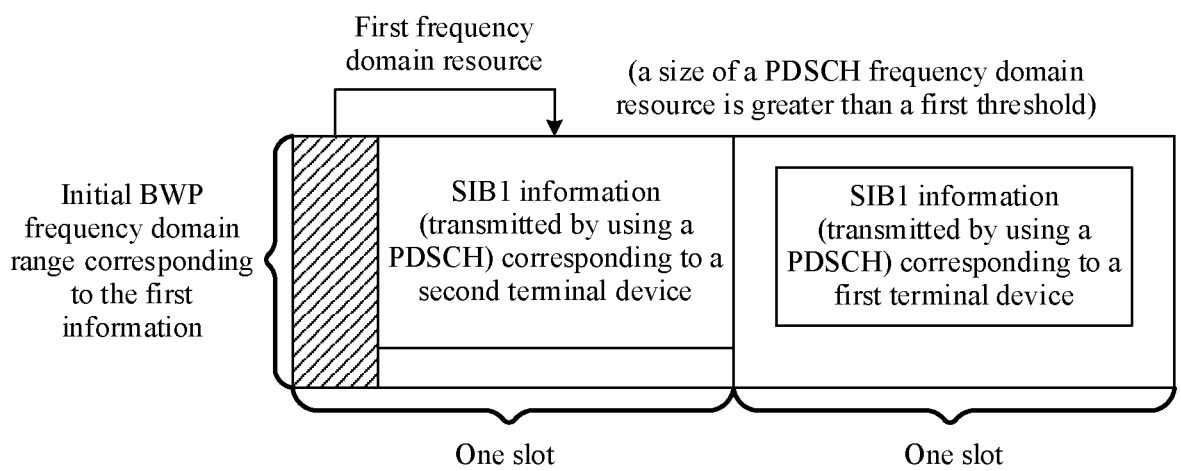

The threshold may be half of the bandwidth including the first information (for example, the initial BWP bandwidth corresponding to the first information), or may be another value. This is not limited in this application. For ease of description, in this application, the bandwidth including the first information is represented by a bandwidth of the first information. FIG. 7(a) and FIG. 7(b) are schematic diagrams of a resource according to this application. It can be learned from FIG. 7(a) and FIG. 7(b) that, the first time domain resource and the second time domain resource may respectively correspond to a resource occupied in time by a SIB1 information transmission channel corresponding to the first terminal device and a resource occupied in time by a SIB1 information transmission channel corresponding to the second terminal device, and the first frequency domain resource and the second frequency domain resource may respectively correspond to a resource occupied in frequency domain by the SIB1 information transmission channel corresponding to the first terminal device in the figure and a resource occupied in frequency domain by the SIB1 information transmission channel corresponding to the second terminal device. A difference between FIG. 7(a) and FIG. 7(b) lies in that the first frequency domain resource shown in FIG. 7(a) is less than the first preset threshold, and the first frequency domain resource shown in FIG. 7(b) is greater than the first preset threshold. Therefore, in FIG. 7(a), the start moment of the first time domain resource in time domain and the start moment of the second time domain resource in time domain are located in a same slot, and in FIG. 7(b), the start moment of the first time domain resource in time domain and the start moment of the second time domain resource in time domain are located in different slots.

Optionally, if the size of the first frequency domain resource is equal to a threshold, for example, the threshold is half of the initial BWP bandwidth corresponding to the first information, the first time domain resource and the second time domain resource are in a same slot.

Preferably, in this application, the initial BWP may be understood as a downlink initial BWP.

Optionally, when a range of the first frequency domain resource is properly included in a first preset frequency domain range, the first time domain resource and the second time domain resource are in a same slot. That a range of the first frequency domain resource is properly included in a first preset frequency domain range indicates that the range of the first frequency domain resource is within, but is not equal to the first preset frequency domain range.

Alternatively, when a first preset frequency domain range is properly included in a range of the first frequency domain resource, the first time domain resource and the second time domain resource are in different slots. That a first preset frequency domain range is properly included in a range of the first frequency domain resource means that the first preset frequency domain range is within, but is not equal to the range of the first frequency domain resource.

Alternatively, when a range of the first frequency domain resource overlaps a first preset frequency domain range, the first time domain resource and the second time domain resource are located in a same slot or different slots. That a range of the first frequency domain resource overlaps a first preset frequency domain range indicates that a start point of the range of the first frequency domain resource overlaps a start point of the first preset frequency domain range, and an end point of the range of the first frequency domain resource overlaps an end point of the first preset frequency domain range.

In a possible implementation, the first preset frequency domain range is a frequency domain range formed by a start point and a midpoint of a frequency domain range corresponding to the bandwidth of the first information. For example, the start point of the first preset frequency domain range is the start point of the frequency domain range corresponding to the bandwidth of the first information, and the end point of the first preset frequency domain range may be a 'roundup $(P/2)'^{th}$ RB or a 'rounddown $(P/2)'^{th}$ RB included in the bandwidth of the first information, or may be a 'roundup $(Q/2)'^{th}$ RBG or a 'rounddown $(Q/2)'^{th}$ RBG included in the bandwidth of the first information. P is a quantity of RBs included in the bandwidth of the first information, Q is a quantity of RBGs included in the bandwidth of the first information, the RBG includes an integer quantity of RBs, and the quantity of included RBs is determined by using the bandwidth of the first information. 'roundup (P/2)' indicates rounding up a result of dividing P by 2, and 'rounddown (P/2)' indicates rounding down a result of dividing P by 2.

In another possible implementation, the first preset frequency domain range is a frequency domain range formed by an end point and a midpoint of a frequency domain range corresponding to the bandwidth of the first information. For example, the start point of the first preset frequency domain range is the midpoint of the frequency domain range corresponding to the bandwidth of the first information, and the end point of the first preset frequency domain range is the end point of the frequency domain range corresponding to the bandwidth of the first information.

In still another possible implementation, the first preset frequency domain range may alternatively be another preset frequency domain range. This is not limited in this application.

Optionally, when a remaining frequency domain resource obtained by subtracting the first frequency domain resource from the bandwidth of the first information may include the second frequency domain resource, the first time domain resource and the second time domain resource are in a same slot; otherwise, the first time domain resource and the second time domain resource are in different slots.

In this application, a comparison relationship between the first frequency domain resource and the first preset threshold may be reflected by using a comparison relationship between the size of the first frequency domain resource and the first preset threshold, or may be reflected by using a comparison relationship between the range of the first frequency domain resource and the first preset frequency domain range.

It should be understood that the foregoing solution to determining, based on the comparison relationship between the range of the first frequency domain resource and the first preset frequency domain range, whether the start moment of the first time domain resource and the start moment of the second time domain resource are in a same slot may be applied to another scenario and another solution, or may be separately implemented. This is not limited in this application.

In a possible implementation, an association relationship exists between the first offset between the first time domain resource and the second time domain resource and the first offset between the first frequency domain resource and the second frequency domain resource. To be specific, the first terminal device determines the first offset between the first frequency domain resource and the second frequency domain resource based on the first offset between the first time domain resource and the second time domain resource; or the first terminal device determines the first offset between the first time domain resource and the second time domain resource based on the first offset between the first frequency domain resource and the second frequency domain resource.

Specifically, the first terminal device may determine the first offset between the first frequency domain resource and the second frequency domain resource based on the first offset between the first time domain resource and the second time domain resource; or the first terminal device may determine the first offset between the first time domain resource and the second time domain resource based on the first offset between the first frequency domain resource and the second frequency domain resource. It may be understood that the association relationship exists between the first offset between the first time domain resource and the second time domain resource and the first offset between the first frequency domain resource and the second frequency domain resource.

Optionally, if the start moment of the first time domain resource and the start moment of the second time domain resource are in different slots, a start point of the first frequency domain resource and a start point of the second frequency domain resource may be the same, and a size of the first frequency domain resource and a size of the second frequency domain resource may be the same; a start point of the first frequency domain resource and a start point of the second frequency domain resource are the same, but a size of the second frequency domain resource is 1/K of a size of the first frequency domain resource, where K is an integer greater than 1; or a start point of the first frequency domain resource and a start point of the second frequency domain resource are the same, but a size of the first frequency domain resource is 1/Q of a size of the second frequency domain resource, where Q is an integer greater than 1.

Optionally, if the start moment of the first time domain resource and the start moment of the second time domain resource are in a same slot, the first frequency domain resource and the second frequency domain resource may be multiplexed in the slot through frequency division multiplexing (frequency division multiplexing, FDM). For example, the start point of the second frequency domain resource may be a next RB of an RB corresponding to an end point of the second frequency domain resource. Alternatively, the start point of the second frequency domain resource may be a next RBG of an RBG corresponding to an end point of the second frequency domain resource. Further optionally, frequency domain resources corresponding to the second frequency domain resource and the first frequency domain resource do not overlap. The size of the second frequency domain resource is 1/K of the size of the first frequency domain resource, where K is an integer greater than 1.

It should be noted that, if an SCS corresponding to the first frequency domain resource is different from an SCS corresponding to the second frequency domain resource, a frequency offset between the first frequency domain resource and the second frequency domain resource may be calculated based on the SCS corresponding to the first frequency domain resource or the SCS corresponding to the second frequency domain resource. This is not limited in this application.

For example, when the first control information is the first MCS, and the second control information is the second MCS, the first offset includes an offset between the first MCS and the second MCS.

As shown in Table 2, currently, an MCS included in a PDCCH scrambled by using an SI-RNTI indicates that a corresponding index range is 0 to 9, and the offset between the first MCS and the second MCS may be a value in 0 to 9.

Optionally, when a coverage capability and a data transmission capability of the first terminal device are lower than those of the second terminal device, an index corresponding to the second MCS is lower than an index corresponding to the first MCS. For example, the first terminal device may use a lower transmission bandwidth and fewer transmit and receive antennas, and these factors affect the coverage capability and the data transmission capability of the first terminal device. Therefore, to ensure coverage and data transmission reliability of the first terminal device at low costs, the first terminal device may transmit the second information by using an MCS lower than that of the second terminal device.

Optionally, the offset between the first MCS and the second MCS may vary with specific MCS values indicated by the first information. For example, if a value of the first MCS is small, the offset between the first MCS and the second MCS may be small or even 0. If a value of the first MCS is large, the offset between the first MCS and the second MCS may be large. Specifically, with reference to Table 2, if spectral efficiency corresponding to the first MCS is less than a threshold (for example, less than 0.5) or a target code rate is less than a threshold (for example, less than ⅓), the offset between the first MCS and the second MCS may be 0 or another value less than an integer value. Alternatively, if spectral efficiency corresponding to an MCS indicated by the first information or a target code rate is greater than a threshold, the offset between the first MCS and the second MCS may be a value greater than an integer value.

TABLE 2

| MCS index | Modulation order | Target bit rate | Spectral efficiency |
| --- | --- | --- | --- |
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |

For example, when the first control information is the first RV, and the second control information is the second RV, the first offset includes an offset between the first RV and the second RV.

The first RV is represented by RV #1, and the offset between the first RV and the second RV is represented by RV-offset. In this case, the second RV may be represented as (RV #1+RV-offset)mod(RV-num). RV-num represents a quantity of RVs that can be supported in downlink data transmission corresponding to the first terminal device. The downlink data transmission corresponding to the first terminal device may be system broadcast information sent by the network device, for example, SIB1 information or other SI, or may be unicast information sent by the network device to the first terminal device. mod represents a modulo operator.

Optionally, the first RV and the second RV may be the same, that is, RV-offset=0.

For example, the first system information includes at least one of the following information:
a first threshold configuration related to cell selection performed by the second terminal device, a first BWP configuration corresponding to the second terminal device, or a first RACH resource corresponding to the second terminal device; and the second system information includes at least one of the following information:
a second threshold configuration related to cell selection performed by the first terminal device, a second BWP configuration corresponding to the first terminal device, or a second RACH resource corresponding to the first terminal device.

The first BWP configuration corresponding to the second terminal device includes a first BWP configuration correspondingly used by the second terminal device in a radio resource control RRC connected state, an idle state, or an inactive state. The second BWP configuration corresponding to the first terminal device includes a second BWP configuration correspondingly used by the first terminal device in the radio resource control RRC connected state, the idle state, or the inactive state.

For example, when the first system information is the first threshold configuration, and the second system information is the second threshold configuration,
the first offset includes a difference between the first threshold configuration and the second threshold configuration.

For example, when the first system information is the first BWP configuration, and the second system information is the second BWP configuration,
the first offset includes a difference between the first BWP configuration and the second BWP configuration.

Specifically, the difference between the first BWP configuration and the second BWP configuration includes at least one of the following:
a frequency offset between a frequency location of a first BWP and a frequency location of a second BWP, a difference between a bandwidth of the first BWP and a bandwidth of the second BWP, a difference between a quantity of first BWPs and a quantity of second BWPs, a difference between a control channel parameter configuration included in the first BWP and a control channel parameter configuration included in the second BWP, and a difference between a data channel parameter configuration included in the first BWP and a data channel parameter configuration included in the second BWP.

The first BWP may be a BWP for uplink data transmission, may be a BWP for downlink data transmission, or may be a BWP for uplink and downlink data transmission. Similarly, the second BWP may be a BWP for uplink data transmission, may be a BWP for downlink data transmission, or may be a BWP for uplink and downlink data transmission.

For example, when the first system information is the first RACH resource, and the second system information is the second RACH resource, the first offset includes a difference between the first RACH resource and the second RACH resource.

Specifically, the difference between the first RACH resource and the second RACH resource includes at least one of the following:

a difference between a quantity of RACH sequences included in the first RACH resource and a quantity of RACH sequences included in the second RACH resource, a time offset between a time resource included in the first RACH resource and a time resource included in the second RACH resource, a difference between a quantity of frequency division multiplexed resources included in the first RACH resource and a quantity of frequency division multiplexed resources included in the second RACH resource, or a difference between an SSB association relationship that is included in the first RACH resource and that is sent by the network device and an SSB association relationship that is included in the second RACH resource and that is sent by the network device.

It should be noted that, in this application, differentiated configurations of the first BWP configuration and the second BWP configuration for a same configuration parameter (for example, the control channel parameter configuration or the data channel parameter configuration), and differentiated configurations of the first RACH resource and the second RACH resource for a same configuration parameter may be respectively understood as the difference between the first BWP configuration and the second BWP configuration, and the difference between the first RACH resource and the second RACH resource.

In a possible implementation, if the first offset is zero, the first information and the second information are the same. In other words, it may be understood that a resource for transmitting the second information reuses a resource for transmitting the first information.

It can be learned from the foregoing descriptions that in Manner 1, when the first control information and the second control information are different information, there are a plurality of specific forms of the first offset, so that flexibility of the method for transmitting initial access configuration information provided in this embodiment of this application is further improved.

Figure 3B:
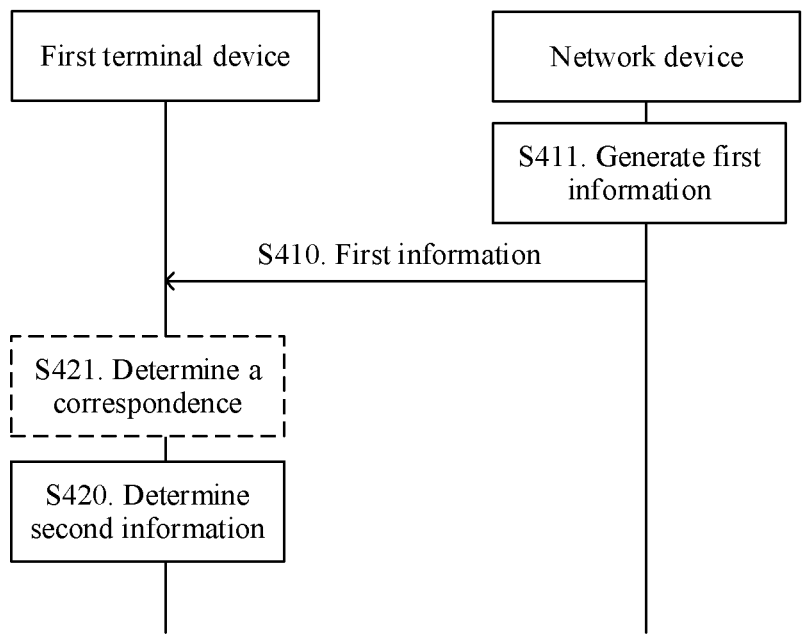

Manner 2:

Specifically, the following describes Manner 2 with reference to FIG. 3(b), to better distinguish between Manner 2 and Manner 1. It should be understood that S410 shown in FIG. 3(b) is similar to S310, and S411 shown in FIG. 3(b) is similar to S311. Details are not described herein again. Further, in Manner 2, after receiving the first information, the first terminal device needs to determine, based on the first information, the second information required by the first terminal device. To be specific, a method procedure shown in FIG. 3(b) includes S420: The first terminal device determines the second information. Different from S320 shown in FIG. 3(a), that the first terminal device determines the second information in Manner 2 means that the first terminal device determines the second information based on the first information and a correspondence. The first information includes first control information and third indication information, and the first terminal device determines the second information based on the third indication information and the correspondence. In Manner 2, the second information includes second system information corresponding to the first terminal device.

In a possible implementation, the correspondence is predefined.

In another possible implementation, the correspondence is associated with at least one of the following parameters: an index corresponding to a synchronization signal block SSB, a synchronization raster corresponding to the SSB, a frequency band occupied by the SSB, a radio resource management RRM measurement result corresponding to the SSB, a capability of the first terminal device, or control information included in a master information block MIB, where the SSB and the first information or the second information meet a quasi-colocation QCL relationship, and the MIB is information carried on a physical broadcast channel PBCH included in the SSB. An association relationship between the correspondence and the parameter is predefined.

In Manner 2, optionally, before S320, the first terminal device determines the correspondence based on the association relationship and at least one of the foregoing parameters. In this case, the method procedure shown in FIG. 3(b) further includes S421: The first terminal device determines the correspondence.

In the two possible implementations, examples are used to describe how to obtain the correspondence. If the correspondence is predefined, a convenient implementation is provided for determining the correspondence. If the correspondence may be determined based on some parameters that are known before the first terminal device completes initial access, the first terminal device may select an appropriate correspondence based on the known parameters, so that flexibility of determining the correspondence is improved. It should be understood that the two possible implementations are merely examples, and do not constitute any limitation on the protection scope of this application. The correspondence may alternatively be determined in another manner, for example, randomly determined by the first terminal device.

Specifically, the first terminal device determines, based on the received first information, initial access configuration data information (the second system information) associated with the first terminal device. The first information includes initial access configuration control information associated with the second terminal device and the third indication information that indicates the initial access configuration data information associated with the first terminal device. In this case, that the first terminal device determines, based on the received first information, initial access configuration data information associated with the first terminal device may be understood as that the first terminal device determines, based on a part of the first information, the initial access configuration data information associated with the first terminal device, and the other part of the first information may be used to indicate the initial access configuration control information associated with the second terminal device.

In a possible implementation, a specific form of the first information in Manner 2 may be shown in Table 3.

TABLE 3

| Number | Content of the first information | Bit overhead |
| --- | --- | --- |
| 1 | Frequency domain resource indication | Related to a BWP in which the first information is located |
| 2 | Time domain resource indication | 4 |
| 3 | Data transmission mapping manner | 1 |
| 4 | MCS | 5 |
| 5 | RV | 2 |
| 6 | System information indicator | 1 |
| 7 | Reserved bit | 15 |

A reserved bit corresponding to number 7 may be understood as the foregoing third indication information. The third indication information may be used to indicate the initial access configuration data information associated with the first terminal device, and information content corresponding to numbers 1 to 6 may be used to indicate the first control information associated with the second terminal device.

It should be understood that the third indication information included in the first information may indicate the initial access configuration data information associated with the first terminal device. For example, a threshold configuration related to cell selection, or another parameter.

For example, two bits in the 15 bits in Table 3 are used to indicate a threshold configuration that is related to cell selection and that corresponds to the first terminal device. In this case, a total of four different thresholds may be indicated. That is, the foregoing correspondence includes a relationship between the two bits in the third indication information and the thresholds that are related to cell selection and that correspond to the first terminal device.

For another example, the third indication information included in the first information may indicate SI control information associated with the first terminal device, namely, control information for scheduling SI information. The SI information herein may be different from SI information associated with the second terminal device, so that the network device can perform adaptation control on different types of terminal devices. The first terminal device can learn of the SI information based on the SI control information. In other words, the correspondence includes a relationship between the third indication information and the SI control information associated with the first terminal device.

Further, the third indication information included in the first information may further indicate a BWP configuration that corresponds to the first terminal device and that can be used in a radio resource control connected (radio resource control connected, RRC connected) state, and may further indicate a RACH resource corresponding to the first terminal device, to implement a differentiated design between the first terminal device and the second terminal device.

For example, a system may include a large quantity of first terminal devices, that is, data transmission corresponding to the first terminal device has a large-connection requirement. In this case, differentiated designs are performed on BWP and RACH resources for the first terminal device and the second terminal device, so that impact of the large-connection first terminal devices on data transmission of the second terminal device can be avoided.

It should be noted that, if not all the initial access configuration data information associated with the first terminal device is indicated by the third indication information included in the first information, the first terminal device may determine, based on the initial access configuration data information associated with the second terminal device, a part of the initial access configuration data information that is missing. A specific determining method may directly use a method for determining the initial access configuration data information associated with the second terminal device. Alternatively, a part of the initial access configuration data information that is associated with the first terminal device and that is missing may be determined by using a predefined first offset between the initial access configuration data information that is associated with the first terminal device and the third indication information included in the first information. To be specific, information included in the initial access configuration information corresponding to the first terminal device may be determined all based on the first information and the correspondence, or may be determined partially based on the first information and the correspondence. This is not limited in this application. Flexibility of a solution to determining the initial access configuration information corresponding to the first terminal device is improved. It should be understood that, in Manner 2, types of information included in the first information are different. One type corresponds to the initial access configuration control information associated with the second terminal device, and another type corresponds to the initial access configuration data information associated with the first terminal device. The first terminal device may determine, based on the first information or based on a relationship between the first information and the initial access configuration data information associated with the first terminal device, the initial access configuration data information associated with the first terminal device.

Preferably, in Manner 2, the first information may be understood as control information for scheduling a SIB1 corresponding to the second terminal device, and the second information may be understood as SIB1 information corresponding to the first terminal device; or the first information may be understood as control information for scheduling other SI of the second terminal device, and the second information may be understood as other SI information corresponding to the first terminal device.

In a possible implementation, the first information is control information for scheduling system information block type 1 SIB1 information, and the first information is transmitted through a physical downlink control channel PDCCH that carries the control information for scheduling the SIB1 information; or the first information is SIB1 information, and the first information is transmitted through a physical downlink shared channel PDSCH that carries the SIB1 information.

After determining the second information, the first terminal device can perform initial access based on the initial access configuration information that corresponds to the first terminal device and that is included in the second information. For example, initial access is performed based on cell access information included in the SIB1.

Further, after completing initial access, the first terminal device can perform data transmission with the network device based on information that is related to a data transmission configuration and that is included in the second information. For example, data transmission is performed with the network device based on scheduling information that is of other system information and that is included in the SIB1.

It should be understood that the network device side also knows the foregoing first offset or correspondence (for example, predefined in a protocol), so that the network device side can learn of initial access configuration information corresponding to different types of terminal devices, and perform data transmission with the different types of terminal devices based on the corresponding configuration information. Details are not described herein again.

Sequence numbers of the foregoing processes do not mean execution sequences in the foregoing method embodiments. The execution sequences of the processes should be determined based on functions and internal logic of the processes, and should not be construed as any limitation on the implementation processes of embodiments of this application. In addition, it is possible that not all operations in the foregoing method embodiments need to be performed.

It should be understood that the terminal device and/or the network device in the foregoing method embodiments may perform some or all of the steps in embodiments. These steps or operations are merely examples. Embodiments of this application may further include performing other operations or variants of various operations.

It should be further understood that, in embodiments of this application, unless otherwise specified or in case of a logical conflict, terms and/or descriptions in different embodiments may be consistent and may be mutually referenced. Technical features in different embodiments may be combined based on an internal logical relationship of the technical features to form a new embodiment.

The foregoing describes in detail the methods for transmitting initial access configuration information in embodiments of this application with reference to FIG. 1 to FIG. 7(a) and FIG. 7(b). The following describes in detail apparatuses for transmitting initial access configuration information in embodiments of this application with reference to FIG. 8 to FIG. 11.

Figure 8:
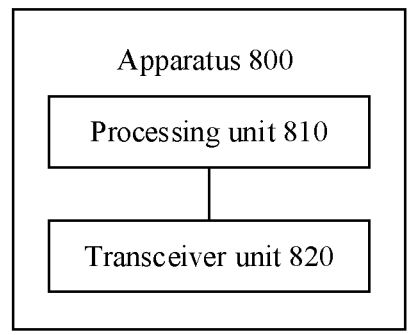
FIG. 8 is a schematic diagram of an apparatus 800 for transmitting initial access configuration information according to this application.

FIG. 8 is a schematic diagram of an apparatus 800 for transmitting initial access configuration information according to this application. As shown in FIG. 8, the apparatus 800 includes a processing unit 810 and a transceiver unit 820.

The transceiver unit 820 is configured to receive first information from a network device, where the first information includes initial access configuration information corresponding to a second terminal device, the apparatus includes a first terminal device or a chip or a circuit disposed in the first terminal device, and the first terminal device and the second terminal device are different types of terminal devices.

The processing unit 810 determines second information based on the first information and a first offset, where the second information includes initial access configuration information corresponding to the first terminal device.

Alternatively, the processing unit 810 determines second information based on the first information and a correspondence, where the second information includes initial access configuration information corresponding to the first terminal device.

In an embodiment, when the first information is first control information, the second information is second control information, where the first control information is for scheduling first system information corresponding to the second terminal device, and the second control information is for scheduling second system information corresponding to the first terminal device; or when the first information is first system information corresponding to the second terminal device, the second information is second system information corresponding to the first terminal device.

In an embodiment, when the first control information is a first time domain resource, and the second control information is a second time domain resource, the first offset includes a time domain offset between a start moment of the first time domain resource and a start moment of the second time domain resource and/or a difference between a time length of the first time domain resource and a time length of the second time domain resource.

In an embodiment, when the start moment of the first time domain resource and the start moment of the second time domain resource are located in different slots, the time domain offset includes: a slot offset and a symbol offset. The slot offset is a difference between a first slot in which the start moment of the first time domain resource is located and a second slot in which the start moment of the second time domain resource is located, and the symbol offset is a difference between a symbol index of the start moment of the first time domain resource in the first slot and a symbol index of the start moment of the second time domain resource in the second slot.

In an embodiment, when an end moment of the first time domain resource is earlier than or equal to a preset moment, the processing unit is further configured to determine that the start moment of the first time domain resource and the start moment of the second time domain resource are located in a same slot; or when an end moment of the first time domain resource is later than a preset moment, the processing unit is further configured to determine that the start moment of the first time domain resource and the start moment of the second time domain resource are located in different slots.

In an embodiment, when the first control information is a first frequency domain resource, and the second control information is a second frequency domain resource, the first offset includes a frequency domain offset between a start point of the first frequency domain resource and a start point of the second frequency domain resource and/or a difference between a size of the first frequency domain resource and a size of the second frequency domain resource.

In an embodiment, when the first frequency domain resource is less than a first preset threshold, the start moment of the first time domain resource and the start moment of the second time domain resource are located in a same slot; or when the first frequency domain resource is greater than a first preset threshold, the start moment of the first time domain resource and the start moment of the second time domain resource are located in different slots.

In an embodiment, the first system information includes at least one of the following information: a first threshold configuration related to cell selection performed by the second terminal device, a first BWP configuration corresponding to the second terminal device, or a first RACH resource corresponding to the second terminal device; and the second system information includes at least one of the following information: a second threshold configuration related to cell selection performed by the first terminal device, a second BWP configuration corresponding to the first terminal device, or a second RACH resource corresponding to the first terminal device. The first offset includes a difference between the first threshold configuration and the second threshold configuration, a difference between the first BWP configuration and the second BWP configuration, or a difference between the first RACH resource and the second RACH resource.

In an embodiment, the first offset is predefined, or the first offset is associated with at least one of the following parameters: an index corresponding to a synchronization signal block SSB, a synchronization raster corresponding to the SSB, a frequency band occupied by the SSB, a radio resource management RRM measurement result corresponding to the SSB, a capability of the first terminal device, or control information included in a master information block MIB, and an association relationship between the first offset and the parameter is predefined, where the SSB and the first information or the second information meet a quasi-colocation QCL relationship, and the MIB is information carried on a physical broadcast channel PBCH included in the SSB. The processing unit 810 is further configured to determine the first offset based on the association relationship and at least one of the foregoing parameters.

In an embodiment, the first information includes first control information and third indication information, where the first control information is for scheduling first system information corresponding to the second terminal device;

that the processing unit 810 determines the second information based on the first information and the correspondence includes: the processing unit 810 determines the second information based on the third indication information and the correspondence, where the second information includes second system information corresponding to the first terminal device.

In an embodiment, the correspondence is predefined, or the correspondence is associated with at least one of the following parameters: an index corresponding to a synchronization signal block SSB, a synchronization raster corresponding to the SSB, a frequency band occupied by the SSB, a radio resource management RRM measurement result corresponding to the SSB, a capability of the first terminal device, or control information included in a master information block MIB, and an association relationship between the correspondence and the parameter is predefined, where the SSB and the first information or the second information meet a quasi-colocation QCL relationship, and the MIB is information carried on a physical broadcast channel PBCH included in the SSB. The processing unit 810 is further configured to determine the correspondence based on the association relationship and at least one of the foregoing parameters.

In an embodiment, the first information is control information for scheduling system information block type 1 SIB1 information, and the first information is transmitted through a physical downlink control channel PDCCH that carries the control information for scheduling the SIB1 information; or the first information is SIB1 information, and the first information is transmitted through a physical downlink shared channel PDSCH that carries the SIB1 information.

The apparatus 800 corresponds to the first terminal device in the method embodiments. The apparatus 800 may be the first terminal device in the method embodiments, or a chip or a functional module in the first terminal device in the method embodiments. The corresponding units of the apparatus 800 are configured to perform corresponding steps performed by the first terminal device in the method embodiment shown in FIG. 3.

The processing unit 810 in the apparatus 800 is configured to perform related steps corresponding to processing performed by the first terminal device in the method embodiments. For example, step S321 of determining a first offset in FIG. 3(a), step S421 of determining a correspondence in FIG. 3(b), step S320 of determining second information in FIG. 3(a), and step S420 of determining second information in FIG. 3(b) are performed.

The transceiver unit 820 in the apparatus 800 performs the receiving and sending steps of the first terminal device in the method embodiments. For example, step S310 of receiving the first information sent by the network device in FIG. 3(a) is performed, and step S410 of receiving the first information sent by the network device in FIG. 3(b) is performed.

The processing unit 810 may be at least one processor. The transceiver unit 820 may be a transceiver or an interface circuit.

The transceiver unit 820 may include a receiving unit and a sending unit. The sending unit is configured to perform a sending step performed by the first terminal device, for example, sending information to another device. The receiving unit is configured to perform a receiving step performed by the first terminal device, for example, receiving information sent by another device. The sending unit may be a transmitter or an interface circuit, and the receiving unit may be a receiver or an interface circuit.

Optionally, the apparatus 800 may further include a storage unit, configured to store data and/or signaling. The processing unit 810 and the transceiver unit 820 may interact with or be coupled to the storage unit, for example, read or invoke data and/or signaling in the storage unit, to perform the methods in the foregoing embodiments.

The foregoing units may exist independently, or may be all or partially integrated.

Figure 9:
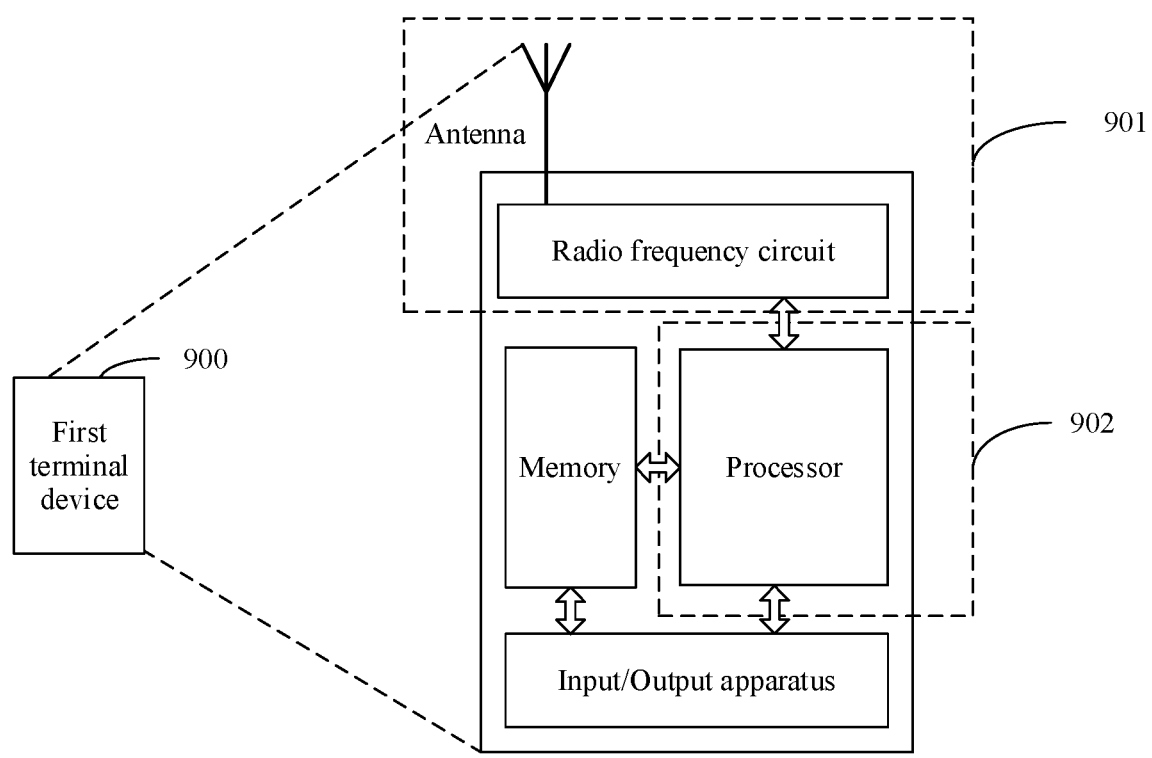
FIG. 9 is a schematic structural diagram of a first terminal device 900 according to this application.

FIG. 9 is a schematic structural diagram of a first terminal device 900 according to this application. The first terminal device 900 may be applied to the system shown in FIG. 1. For ease of description, FIG. 9 shows only main components of the first terminal device. As shown in FIG. 9, the first terminal device 900 includes a processor, a memory, a radio frequency circuit, an antenna, and an input/output apparatus. The processor is configured to control the antenna and the input/output apparatus to receive or send a signal. The memory is configured to store a computer program. The processor is configured to invoke the computer program from the memory and run the computer program. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus such as a touchscreen, a display screen, or a keyboard is mainly configured to: receive data entered by a user, and output data to the user. It should be noted that some types of terminal devices may not have the input/output apparatus.

When data needs to be sent, the processor performs baseband processing on the to-be-sent data, and then outputs a baseband signal to the radio frequency circuit. The radio frequency circuit performs radio frequency processing on the baseband signal and then sends a radio frequency signal to the outside in a form of an electromagnetic wave through the antenna. When data is sent to the terminal device, the radio frequency circuit receives the radio frequency signal through the antenna, converts the radio frequency signal into a baseband signal, and outputs the baseband signal to the processor, and the processor converts the baseband signal into data and processes the data.

A person skilled in the art may understand that for ease of description, FIG. 9 shows only one memory and only one processor. An actual first terminal device may include a plurality of processors and memories. The memory may also be referred to as a storage medium, a storage device, or the like. This is not limited in embodiments of this application.

In this embodiment of this application, the antenna and the radio frequency circuit that have receiving and sending functions may be considered as a transceiver unit of the terminal device, and the processor that has a processing function may be considered as a processing unit of the terminal device. As shown in FIG. 9, the first terminal device includes a transceiver unit 901 and a processing unit 902. The transceiver unit may also be referred to as a transceiver, a transceiver, a transceiver apparatus, or the like. The processing unit may also be referred to as a processor, a processing board, a processing module, a processing apparatus, or the like. Optionally, a component for implementing a receiving function in the transceiver unit 901 may be considered as a receiving unit, and a component for implementing a sending function in the transceiver unit 901 may be considered as a sending unit. That is, the transceiver unit 901 includes the receiving unit and the sending unit. The transceiver unit sometimes may also be referred to as a transceiver, a transceiver, a transceiver circuit, or the like.

The receiving unit sometimes may also be referred to as a receiver, a receiver, a receiver circuit, or the like. The sending unit sometimes may also be referred to as a transmitter, a transmitter, a transmitter circuit, or the like.

It should be understood that the transceiver unit 901 is configured to perform a sending operation and a receiving operation on the first terminal device side in the foregoing method embodiments, and the processing unit 902 is configured to perform an operation other than the sending operation and the receiving operation performed by the first terminal device in the foregoing method embodiments.

For example, in an implementation, the transceiver unit 901 is configured to perform the receiving operation on the first terminal device side in step S310 in FIG. 3(*a*), and/or the transceiver unit 901 is further configured to perform another sending step and another receiving step on the first terminal device side in embodiments of this application. The processing unit 902 is configured to perform step S320 and step S321 in FIG. 3(*a*), and/or the processing unit 902 is further configured to perform another processing step on the first terminal device side in embodiments of this application.

For another example, in another implementation, the transceiver unit 901 is configured to perform the receiving operation on the first terminal device side in step S410 in FIG. 3(*b*), and/or the transceiver unit 901 is further configured to perform another sending step and another receiving step on the first terminal device side in embodiments of this application. The processing unit 902 is configured to perform step S420 and step S421 in FIG. 3(*b*), and/or the processing unit 902 is further configured to perform another processing step on the first terminal device side in embodiments of this application.

When the first terminal device is a chip-type apparatus or circuit, the first terminal device may include a transceiver unit and a processing unit. The transceiver unit may be an input/output circuit and/or a communication interface. The processing unit is an integrated processor, a microprocessor, or an integrated circuit.

Figure 10:
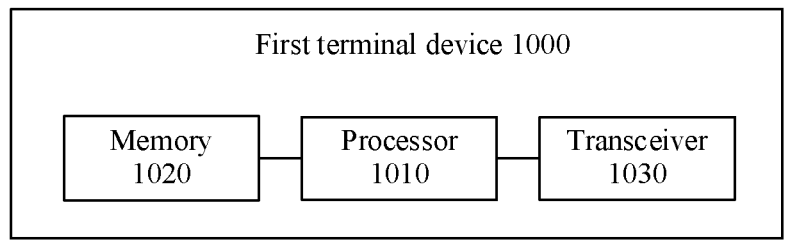
FIG. 10 is a schematic structural diagram of another first terminal device 1000 according to this application.

FIG. 10 is a schematic structural diagram of another first terminal device 1000 according to an embodiment of this application. The first terminal device 1000 includes a processor 1010, a memory 1020, and a transceiver 1030. The memory 1020 stores instructions or programs. The processor 1010 is configured to execute the instructions or the programs stored in the memory 1020. When the instructions or the programs stored in the memory 1020 is executed, the processor 1010 is configured to perform an operation performed by the processing unit 810 in the foregoing embodiment, and the transceiver 1030 is configured to perform an operation performed by the transceiver unit 820 in the foregoing embodiment.

It should be understood that the apparatus 800 or the first terminal device 1000 according to embodiments of this application may correspond to the first terminal device in the method embodiments of this application, and operations and/or functions of modules in the apparatus 800 or the first terminal device 1000 are respectively used to implement corresponding procedures of the methods in FIG. 3(*a*) and FIG. 3(*b*). For brevity, details are not described herein again.

Figure 11:
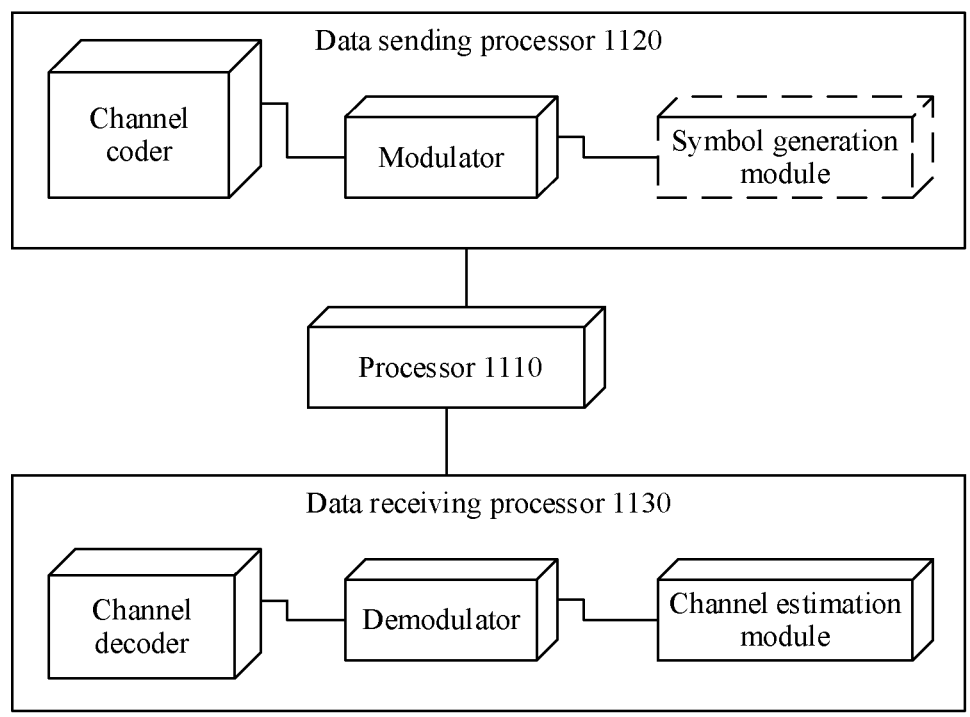
FIG. 11 is a schematic structural diagram of still another first terminal device 1100 according to this application.

For the first terminal device in this embodiment, refer to a device shown in FIG. 11. FIG. 11 is a schematic structural diagram of another first terminal device 1100 according to an embodiment of this application. In an example, the device may implement a function similar to that of the processor 1010 in FIG. 10. In FIG. 11, the device includes a processor 1110, a data sending processor 1120, and a data receiving processor 1130. The processing unit 810 in the foregoing embodiment may be the processor 1110 in FIG. 11, and implements a corresponding function. The transceiver unit 820 in the foregoing embodiment may be the data sending processor 1120 and/or the data receiving processor 1130 in FIG. 11. Although FIG. 11 shows a channel encoder and a channel decoder, it may be understood that the modules are merely examples, and do not constitute a limitation on this embodiment.

It should be understood that, the processor in embodiments of this application may be a central processing unit (CPU), or may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

It may be further understood that the memory in embodiments of this application may be a volatile memory or a nonvolatile memory, or may include the volatile memory and the nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and is used as an external cache. By way of example but not limitative description, many forms of random access memories (RAM) may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus dynamic random access memory (DR RAM).

All or some of the foregoing embodiments may be implemented by using software, hardware, firmware, or any combination thereof. When the software is used to implement embodiments, all or some of the foregoing embodiments may be implemented in a form of a computer program product. The computer program product includes one or more computer instructions or computer programs. When the program instructions or the computer programs are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

An embodiment of this application further provides a communication system. The communication system includes the foregoing first terminal device and the foregoing network device. The communication system further includes the foregoing second terminal device. For example, the communication system includes an NR-light terminal device, a non-NR-light terminal device, and an access network device.

An embodiment of this application further provides a computer-readable medium, configured to store computer program code. The computer program includes instructions used to perform the methods for transmitting initial access configuration information in the method embodiments of this application. The readable medium may be a read-only memory (ROM) or a random access memory (RAM). This is not limited in this embodiment of this application.

This application further provides a computer program product. The computer program product includes instructions. When the instructions are executed, a light terminal device and a network device are enabled to respectively perform operations corresponding to the first terminal device and the network device in the foregoing methods.

An embodiment of this application further provides a system chip. The system chip includes a processing unit and a communication unit. The processing unit may be, for example, a processor, and the communication unit may be, for example, an input/output interface, a pin, a circuit, or the like. The processing unit may execute computer instructions, to enable a chip in the communication apparatus to perform any method for transmitting initial access configuration information provided in the foregoing embodiments of this application.

Optionally, any communication apparatus provided in the foregoing embodiments of this application may include the system chip.

Optionally, the computer instructions are stored in a storage unit.

Optionally, the storage unit is a storage unit in the chip, for example, a register or a cache. The storage unit may further be a storage unit, such as a ROM, another type of static storage device that can store static information and instructions, or a RAM, that is outside the chip and that is in the terminal. The processor mentioned above may be a CPU, a microprocessor, an ASIC, or one or more integrated circuits configured to control program execution of the foregoing methods for transmitting initial access configuration information. The processing unit and the storage unit may be decoupled, are separately disposed on different physical devices, and are connected in a wired or wireless manner to implement respective functions of the processing unit and the storage unit, so as to support the system chip in implementing various functions in the foregoing embodiments. Alternatively, the processing unit and the memory may be coupled to a same device.

It may be understood that the memory in embodiments of this application may be a volatile memory or a nonvolatile memory, or may include the volatile memory and the nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and is used as an external cache. By way of example but not limitative description, many forms of random access memories (RAM) may be used, for example, a static random access memory (SRAM), a dynamic random access memory (DRAM), a synchronous dynamic random access memory SDRAM), a double data rate synchronous dynamic random access memory (DDR SDRAM), an enhanced synchronous dynamic random access memory (ESDRAM), a synchlink dynamic random access memory (SLDRAM), and a direct rambus dynamic random access memory (DR RAM).

The terms "system" and "network" in this specification may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

Terms "uplink" and "downlink" in this application are used to describe a data/information transmission direction in a specific scenario. For example, the "uplink" direction usually refers to a direction in which data/information is transmitted from a terminal to a network side, or a direction in which a distributed unit transmits data/information to a centralized unit, and the "downlink" direction usually refers to a direction in which data/information is transmitted from a network side to a terminal. Alternatively, in a transmission direction from the centralized unit to the distributed unit, it may be understood that "uplink" and "downlink" are merely used to describe a data/information transmission direction, and a specific start/end device of the data/information transmission is not limited.

In this application, names may be assigned to various objects such as various messages/information/devices/network elements/systems/apparatuses/actions/operations/procedures/concepts. It may be understood that these specific names do not constitute a limitation on related objects, the assigned names may change with factors such as a scenario, a context, or a use habit. Technical meanings of technical terms in this application should be mainly understood based on functions and technical effects reflected/executed by the technical terms in the technical solutions.

Persona of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. Persons skilled in the art may use different methods to implement the described functions for each particular application, but it should not be considered that the implementation goes beyond the scope of this application.

It may be clearly understood by persons skilled in the art that, for the purpose of convenient and brief description, for a detailed working process of the foregoing systems, apparatuses, and units, refer to a corresponding process in the foregoing method embodiment. Details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or the units may be implemented in electronic, mechanical, or other forms.

The units described as separate components may or may not be physically separate, and components displayed as units may or may not be physical units. To be specific, the components may be located at one position, or may be distributed on a plurality of network units. Some or all of the units may be selected based on actual requirements to achieve the objectives of the solutions in embodiments.

In addition, functional units in embodiments of this application may be integrated into one processing unit, each of the units may exist alone physically, or two or more units are integrated into one unit.

When the functions are implemented in a form of a software functional unit and sold or used as an independent product, the functions may be stored in the computer-readable storage medium. Based on this understanding, the technical solutions of this application essentially, or the part contributing to the conventional technology, or some of the technical solutions may be implemented in a form of a software product. The computer software product is stored in a storage medium, and includes several instructions for instructing a computer device (which may be, for example, a personal computer, a server, or a network device) to perform all or some of the steps of the methods described in embodiments of this application. The storage medium includes a USB flash drive, a removable hard disk, a read-only memory (read-only memory, ROM), a random access memory.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
receiving, by a first terminal device from a network device, first information, wherein the first information includes first initial access configuration information corresponding to a second terminal device, and wherein the first terminal device and the second terminal device are of different types; and
determining, by the first terminal device, second information based on the first information and a first offset, wherein the second information includes second initial access configuration information corresponding to the first terminal device,
wherein the first offset includes a frequency domain offset, the first information indicates a first frequency domain resource, the second information indicates a second frequency domain resource based on the first frequency domain resource and the frequency domain offset, and at least a portion of the second frequency domain resource is outside the first frequency domain resource,
wherein the first information indicates a first time domain resource, and the second information indicates a second time domain resource, the first offset includes a time domain offset between a first start moment of the first time domain resource and a second start moment of the second time domain resource or a difference between a first time length of the first time domain resource and a second time length of the second time domain resource, and wherein:
when the first start moment of the first time domain resource and the second start moment of the second time domain resource are located in different slots, the time domain offset includes a slot offset and a symbol offset, the slot offset is a difference between a first slot in which the first start moment of the first time domain resource is located and a second slot in which the second start moment of the second time domain resource is located, and the symbol offset is a difference between a first symbol index of the first start moment of the first time domain resource in the first slot and a second symbol index of the second start moment of the second time domain resource in the second slot, or
when the first frequency domain resource is less than a first preset threshold, the first start moment of the first time domain resource and the second start moment of the second time domain resource are located in a same slot, or
when the first frequency domain resource is greater than the first preset threshold, the first start moment of the first time domain resource and the second start moment of the second time domain resource are located in the different slots.

2. The method according to claim 1,
wherein when the first information includes first control information, the second information includes second control information, wherein the first control information schedules first system information corresponding to the second terminal device, and wherein the second control information schedules second system information corresponding to the first terminal device, or
wherein when the first information includes first system information corresponding to the second terminal device, the second information includes second system information corresponding to the first terminal device.

3. The method according to claim 2, wherein the first control information indicates at least one of:
the first frequency domain resource for transmitting the first system information, the first time domain resource for transmitting the first system information, a first modulation and coding scheme (MCS) for transmitting the first system information, a first redundancy version (RV) for transmitting the first system information, or a first indicator for distinguishing a type of the first system information; and
the second control information indicates at least one of:
the second frequency domain resource for transmitting the second system information, the second time domain resource for transmitting the second system information, a second MCS for transmitting the second system information, a second RV for transmitting the second system information, or a second indicator for distinguishing a type of the second system information.

4. The method according to claim 1, wherein when an end moment of the first time domain resource is earlier than or equal to a preset moment, the method further comprises:
determining, by the first terminal device, that the first start moment of the first time domain resource and the second start moment of the second time domain resource are located in the same slot, or wherein when the end moment of the first time domain resource is later than the preset moment, the method further comprises:
    determining, by the first terminal device, that the first start moment of the first time domain resource and the second start moment of the second time domain resource are located in the different slots.

5. The method according to claim 3, wherein when the first control information indicates the first frequency domain resource, and the second control information indicates the second frequency domain resource,
    the first offset includes the frequency domain offset between a first start point of the first frequency domain resource and a second start point of the second frequency domain resource or a difference between a first size of the first frequency domain resource and a second size of the second frequency domain resource.

6. The method according to claim 3, wherein when the first control information indicates the first MCS and the second control information indicates the second MCS,
    the first offset includes an offset between the first MCS and the second MCS.

7. The method according to claim 3, wherein when the first control information indicates the first RV and the second control information indicates the second RV,
    the first offset includes an offset between the first RV and the second RV.

8. An apparatus, comprising:
    at least one processor; and
    a non-transitory computer readable storage medium storing programming, the programming including instructions that, when executed by the at least one processor, cause the apparatus to perform operations including:
        receiving first information from a network device, wherein the first information includes first initial access configuration information corresponding to a second terminal device, the apparatus comprises a first terminal device or a chip or a circuit disposed in the first terminal device, and wherein the first terminal device and the second terminal device are of different types; and
        determining second information based on the first information and a first offset, wherein the second information includes second initial access configuration information corresponding to the first terminal device,
    wherein the first offset includes a frequency domain offset, the first information indicates a first frequency domain resource, the second information indicates a second frequency domain resource based on the first frequency domain resource and the frequency domain offset, and at least a portion of the second frequency domain resource is outside the first frequency domain resource,
    wherein the first information indicates a first time domain resource, and the second information indicates a second time domain resource, the first offset includes a time domain offset between a first start moment of the first time domain resource and a second start moment of the second time domain resource or a difference between a first time length of the first time domain resource and a second time length of the second time domain resource, and wherein:
        when the first start moment of the first time domain resource and the second start moment of the second time domain resource are located in different slots, the time domain offset includes a slot offset and a symbol offset, the slot offset is a difference between a first slot in which the first start moment of the first time domain resource is located and a second slot in which the second start moment of the second time domain resource is located, and the symbol offset is a difference between a first symbol index of the first start moment of the first time domain resource in the first slot and a second symbol index of the second start moment of the second time domain resource in the second slot, or
        when the first frequency domain resource is less than a first preset threshold, the first start moment of the first time domain resource and the second start moment of the second time domain resource are located in a same slot, or
        when the first frequency domain resource is greater than the first preset threshold, the first start moment of the first time domain resource and the second start moment of the second time domain resource are located in the different slots.

9. The apparatus according to claim 8, wherein when the first information includes first control information, the second information includes second control information, wherein the first control information schedules first system information corresponding to the second terminal device, and wherein the second control information schedules second system information corresponding to the first terminal device, or
    wherein when the first information includes first system information corresponding to the second terminal device, the second information includes second system information corresponding to the first terminal device.

10. The apparatus according to claim 9, wherein the first control information indicates at least one of:
    the first frequency domain resource for transmitting the first system information, the first time domain resource for transmitting the first system information, a first modulation and coding scheme (MCS) for transmitting the first system information, a first redundancy version (RV) for transmitting the first system information, or a first indicator for distinguishing a type of the first system information; and
    the second control information indicates at least one of:
    the second frequency domain resource for transmitting the second system information, the second time domain resource for transmitting the second system information, a second MCS for transmitting the second system information, a second RV for transmitting the second system information, or a second indicator for distinguishing a type of the second system information.

11. The apparatus according to claim 8, wherein when an end moment of the first time domain resource is earlier than or equal to a preset moment, the operations further comprise:
    determining that the first start moment of the first time domain resource and the second start moment of the second time domain resource are located in the same slot; or
    wherein when the end moment of the first time domain resource is later than the preset moment, the operations further comprise:
    determining that the first start moment of the first time domain resource and the second start moment of the second time domain resource are located in the different slots.

12. The apparatus according to claim 10, wherein when the first control information indicates the first frequency domain resource, and the second control information indicates the second frequency domain resource, the first offset includes the frequency domain offset between a first start point of the first frequency domain resource and a second start point of the second frequency domain resource or a difference between a first size of the first frequency domain resource and a second size of the second frequency domain resource.

13. The apparatus according to claim 10, wherein when the first control information indicates the first MCS, and the second control information indicates the second MCS, the first offset includes an offset between the first MCS and the second MCS.

14. The apparatus according to claim 10, wherein when the first control information indicates the first RV, and the second control information indicates the second RV, the first offset indicates an offset between the first RV and the second RV.

* * * * *